(12) United States Patent
Davis

(10) Patent No.: US 12,509,517 B2
(45) Date of Patent: Dec. 30, 2025

(54) MODIFIED ANTIBODIES

(71) Applicant: OXFORD UNIVERSITY INNOVATION LIMITED, Oxford (GB)

(72) Inventor: Simon John Davis, Oxford (GB)

(73) Assignee: OXFORD UNIVERSITY INNOVATION LIMITED, Oxford (GB)

( * ) Notice: Subject to any disclaimer, the term of this patent is extended or adjusted under 35 U.S.C. 154(b) by 1059 days.

(21) Appl. No.: 17/415,027

(22) PCT Filed: Dec. 17, 2019

(86) PCT No.: PCT/GB2019/053570
§ 371 (c)(1),
(2) Date: Jun. 17, 2021

(87) PCT Pub. No.: WO2020/128447
PCT Pub. Date: Jun. 25, 2020

(65) Prior Publication Data
US 2022/0064300 A1 Mar. 3, 2022

(30) Foreign Application Priority Data
Dec. 17, 2018 (GB) .................... 1820547

(51) Int. Cl.
C07K 16/28 (2006.01)
(52) U.S. Cl.
CPC ...... *C07K 16/2818* (2013.01); *C07K 2317/24* (2013.01); *C07K 2317/53* (2013.01); *C07K 2317/75* (2013.01)
(58) Field of Classification Search
CPC .............................. C07K 16/2818
USPC .................................. 424/133.1
See application file for complete search history.

(56) References Cited

U.S. PATENT DOCUMENTS

| | | |
|---|---|---|
| 4,816,567 A | 3/1989 | Cabilly et al. |
| 5,312,335 A | 5/1994 | McKinnon et al. |
| 5,770,429 A | 6/1998 | Lonberg et al. |
| 6,075,181 A | 6/2000 | Kucherlapati et al. |
| 6,150,584 A | 11/2000 | Kucherlapati et al. |
| 6,331,415 B1 | 12/2001 | Cabilly et al. |
| 6,620,135 B1 | 9/2003 | Weston et al. |
| 6,982,321 B2 | 1/2006 | Winter |
| 7,041,870 B2 | 5/2006 | Tomizuka et al. |
| 7,087,409 B2 | 8/2006 | Barbas, III et al. |
| 7,189,826 B2 | 3/2007 | Rodman |
| 7,595,048 B2 | 9/2009 | Honjo et al. |
| 2007/0061900 A1 | 3/2007 | Murphy et al. |
| 2007/0237779 A1* | 10/2007 | Ledbetter ......... C07K 16/2809 424/155.1 |
| 2012/0201746 A1 | 8/2012 | Liu et al. |
| 2014/0302038 A1 | 10/2014 | Dimasi et al. |
| 2014/0348743 A1 | 11/2014 | Korman et al. |
| 2016/0237132 A1 | 8/2016 | Alvarez et al. |
| 2017/0121379 A1 | 5/2017 | Zhang et al. |
| 2017/0340705 A1 | 11/2017 | Pule et al. |

FOREIGN PATENT DOCUMENTS

| | | |
|---|---|---|
| CN | 101048425 A | 10/2007 |
| CN | 107172880 A | 9/2017 |
| EP | 2342228 B1 | 9/2017 |
| WO | WO 1997/004801 A1 | 2/1997 |
| WO | WO 2004/056875 A1 | 7/2004 |
| WO | WO 2005/017148 A1 | 2/2005 |
| WO | WO 2013/070565 A1 | 5/2013 |
| WO | WO 2013/184939 A2 | 12/2013 |
| WO | WO 2015/171863 A1 | 11/2015 |
| WO | WO 2020/077257 A1 | 4/2020 |

OTHER PUBLICATIONS

Gu et al (Cancer Res, 2005, 65(20): 9495-9500).*
Robinette et al (The Journal of Immunology, 2009, 183(7): 4628-4638).*
Boxx et al (Molecular Immunology, 46: 473-480).*
Klein et al (Protein Engineering, Design & Selection, 2014, 27(10): 325-330).*
Roben et al (J. Virl, 1994, 68: 4821-4828).*
Ching et al (Liquid Chromatographic Techniques, Separation Science and Technology, 1989, 24(7-8): 581-597).*
Arora et al., "Affinity chromatography: A versatile technique for antibody purification," *Methods*, 116:84-94 (2016).
Attarwala, "TGN1412: From Discovery to Disaster," *J Young Pharm.*, 2(3):332-336 (2010).
Baudino et al., "Crucial role of aspartic acid at position 265 in the CH2 domain for murine IgG2a and IgG2b Fc-associated effector functions," *J. Immunol.*, 181(9):6664-6669 (2008).
Bennett et al., "Program death-1 engagement upon TCR activation has distinct effects on costimulation and cytokine-driven proliferation: attenuation of ICOS, IL-4, and IL-21, but not CD28, IL-7, and IL-15 responses," *J Immunol.*, 170(2):711-718 (2003).
Boerner et al., "Production of antigen-specific human monoclonal antibodies from in vitro-primed human splenocytes," *J. Immunol.*, 147(1):86-95 (1991).

(Continued)

*Primary Examiner* — Sean E Aeder
(74) *Attorney, Agent, or Firm* — Greenberg Traurig, LLP

(57) ABSTRACT

Provided herein are antibody construct molecules comprising (i) an Fc receptor binding site, (ii) an antigen-binding site and (iii) a spacer moiety located between (i) and (ii), wherein the spacer moiety serves to increase the distance between (i) and (ii) so as to reduce the agonistic activity of the molecule as compared to the antibody variant that lacks (iii). Disclosed are various antibodies that can be de-agonized by introduction of the spacer moiety. Of specific interest are agonistic check point targeting antibodies that are de-agonized by introduction of the spacer moiety.

19 Claims, 11 Drawing Sheets

Specification includes a Sequence Listing.

(56) References Cited

OTHER PUBLICATIONS

Brodeur et al., Mouse-Human Myeloma Partners for the Production of Heterohybridomas,: *Monoclonal Antibody Production Techniques and Applications*, Schook ed., Marcel Dekker, Inc., New York, pp. 51-63 (1987).
Chang et al., "Initiation of T cell signaling by CD45 segregation at 'close contacts'," *Nat. Immunol.*, 17(5):574-582 (2016).
Clackson et al., "Making antibody fragments using phage display libraries," *Nature*, 352(6336):624-628 (1991).
Cockett et al., "High level expression of tissue inhibitor of metalloproteinases in Chinese hamster ovary cells using glutamine synthetase gene amplification," *Biotechnology*, 8:662-667 (1990).
Dall'Acqua et al., "Modulation of the Effector Functions of a Human IgG1 through Engineering of Its Hinge Region," *J. Immunol.*, 177(2):1129-1138 (2006).
Davis et al., "The kinetic-segregation model: TCR triggering and beyond," *Nat. Immunol.*, 7(8):803-809 (2006).
Dunbar et al., "SabPred structure-based antibody prediction serve," *Nucleic Acids Res.*, 44(W1):W474-W478 (2016).
Duncan et al., "Localization of the binding site for the human high-affinity Fc receptor on IgG," *Nature*, 332:563-564 (1988).
Erickson, "Size and Shape of Protein Molecules at the Nanometer Level Determined by Sedimentation, Gel Filtration, and Electron Microscopy," *Biol. Proced. Online*, 11:32-51 (2009).
Foecking et al., "Powerful and versatile enhancer-promoter unit for mammalian expression vectors," *Gene*, 45(1):101-105 (1986).
Harris, "Production of humanized monoclonal antibodies for in vivo imaging and therapy," *Biochem. Soc. Transactions*, 23(4):1035-1038 (1995).
Hattori et al., "Antigen clasping by two antigen-binding sites of an exceptionally specific antibody for histone methylation," *Proc. Natl. Acad. Sci. USA*, 113(8):2092-2097 (2016).
Hezareh et al., "Effector function activities of a panel of mutants of a broadly neutralizing antibody against human immunodeficiency virus type 1," *J. Virol.*, 75:12161-12168 (2001).
Holliger et al, ""Diabodies": small bivalent and bispecific antibody fragments," *Proc. Natl. Acad. Sci. USA*, 90(14):6444-6448 (1993).
Hurle et al., "Protein engineering techniques for antibody humanization," *Curr. Op. Biotech.*, 5(4):428-433 (1994).
Jäger et al., "High level transient production of recombinant antibodies and antibody fusion proteins in HEK 293T cells," *BMC Biotechnol.*, 13:52 (2013).
Jentoft, "Why are proteins O-glycosylated?," *Trends Biochem Sci.*, 15(8):291-294 (1990).
Jones et al., "Replacing the complementarity-determining regions in a human antibody with those from a mouse," *Nature*, 321(6069):522-525 (1986).
Knappik et al., "Fully synthetic human combinatorial antibody libraries (HuCAL) based on modular consensus frameworks and CDRs randomized with trinucleotides," *J. Mol. Biol.*, 296(1):57-86 (2000).
Kohler et al., "Continuous cultures of fused cells secreting antibody of predefined specificity," *Nature*, 256(5517):495-497 (1975).
Kostelny et al., "Formation of a bispecific antibody by the use of leucine zippers," *J Immunol.*, 148(5):1547-1553 (1992).
Kozbor et al., "A human hybrid myeloma for production of human monoclonal antibodies," *J. Immunol.*, 133(6):3001-3005 (1984).
Krebs et al., "High-throughput generation and engineering of recombinant human antibodies," *J. Immunol. Methods*, 254:67-84 (2001).
Krissinel et al., "Inference of macromolecular assemblies from crystalline state," *J. Mol. Biol.*, 372(3):774-797 (2007).
Kuhn et al., "Therapeutic anti-CD3 monoclonal antibodies: from bench to bedside," *Immunology*, 8:889-906 (2016).
Kunert et al., "Advances in recombinant antibody manufacturing," *Appl. Microbiol. Biotechnol.*, 100(8):3451-3461 (2016).
Li et al., "Human antibodies for immunotherapy development generated via a human B cell hybridoma technology," *Proc. Natl. Acad. Sci. USA*, 103(10):3557-3562 (2006).
Lin et al., "Efficient expansion of regulatory T cells in vitro and in vivo with a CD28 superagonist," *Eur. J. Immunol.*, 33(3):626-638 (2003).
Lonberg, "Human antibodies from transgenic animals," *Nat. Biotechnol.* 23(9):1117-1125 (2005).
Lu et al., "On the evolution of the standard amino-acid alphabet," *Genome Biol.*, 7(1):102 (2006).
Lux et al., "Impact of immune complex size and glycosylation on IgG binding to human FcγRs," *J. Immunol.*, 190(8):4315-4323 (2013).
Marks et al., "By-passing immunization. Human antibodies from V-gene libraries displayed on phage," *J. Mol. Biol.*, 222(3):581-597 (1991).
Milstein et al., "Hybrid hybridomas and their use in immunohistochemistry," *Nature*, 305(5934):537-539 (1983).
Mimura et al., "Role of oligosaccharide residues of IgG1-Fc in Fc gamma RIIb binding," *J. Biol. Chem.*, 276:45539-45547 (2001).
Ni, "Research progress and future perspectives in antibodomics and antibodomic Drugs," *Xiandai Mianyixue*, 26(4):265-268 (2006).
Park et al., "Future prospects of immune checkpoint blockade in cancer: from response prediction to overcoming resistance," *Exp. Mol. Med.*, 50(8):109 (2018).
Perez-Vilar et al., "The Structure and Assembly of Secreted Mucins," *J. Biol. Chem.*, 274:31751-31754 (1999).
Perez-Vilar et al.,. "Supplementary information in the on-line journal for the minireview entitled "The Structure and Assembly of Secreted Mucins"," *J. Biol. Chem.*, pp. 1-16 (1999).
Presta, "Antibody engineering," *Curr. Op. Struct. Biol.*, 2:593-596 (1992).
Riechmann et al., "Reshaping human antibodies for therapy," *Nature*, 332:323-329 (1988).
Schmid et al., "Size-dependent protein segregation at membrane interfaces," *Nat. Phys.*, 12(7):704-711 (2016).
Songsivilai et al., "Bispecific antibody: a tool for diagnosis and treatment of disease," *Clin. Exp. Immunol.*, 79(3):315-321 (1990).
Tacke et al., "CD28-mediated induction of proliferation in resting T cells in vitro and in vivo without engagement of the T cell receptor: evidence for functionally distinct forms of CD28," *Eur J Immunol.*, 27(1):239-247 (1997).
Traunecker et al., "Bispecific single chain molecules (Janusins) target cytotoxic lymphocytes on HIV infected cells," *EMBO J.*, 10(12):3655-3659 (1991).
Traunecker et al., "Janusin: new molecular design for bispecific reagents," *Int. J. Cancer Suppl.*, 7:51-52 (1992).
Vaswani et al., "Humanized antibodies as potential therapeutic drugs," *Ann. Allergy, Asthma & Immunol.*, 81(2):105-115 (1998).
Vink et al., "A simple, robust and highly efficient transient expression system for producing antibodies," *Methods*, 65(1):5-10 (2014).
Vollmers et al., "Death by stress: natural IgM-induced apoptosis," *Methods Find. Exp. Clin. Pharmacol.*, 27(3):185-191 (2005).
Vollmers et al., "The "early birds": natural IgM antibodies and immune surveillance," *Histol. Histopathol.*, 20(3):927-937 (2005).
White et al., "Conformation of the Human Immunoglobulin G2 Hinge Imparts Superagonistic Properties to Immunostimulatory Anticancer Antibodies," *Cancer Cell*, 27(1):138-148 (2015).
Wines et al., "The IgG Fc contains distinct Fc receptor (FcR) binding sites: the leukocyte receptors Fc gamma RI and Fc gamma RIIa bind to a region in the Fc distinct from that recognized by neonatal FcR and protein A," *J Immunol.*, 164(10):5313-5318 (2000).
Xie et al., "Adding amino acids to the genetic repertoire," *Curr Opin Chem Biol.*, 9(6):548-554 (2005).
Zhang et al., "Structural and functional analysis of the costimulatory receptor programmed death-1," *Immunity*, 20(3):337-347 (2004).
Lippert et al., "Antibody agonists trigger immune receptor signaling through local exclusion of receptor-type protein tyrosine phosphatases," *Immunity*, 57(2): 256-270 (2024).

\* cited by examiner

SEQUENCE LISTING

```
<160> NUMBER OF SEQ ID NOS: 8

<210> SEQ ID NO 1
<211> LENGTH: 457
<212> TYPE: PRT
<213> ORGANISM: Homo sapiens
<220> FEATURE:
<221> NAME/KEY: MISC_FEATURE
<222> LOCATION: (31)..(35)
<223> OTHER INFORMATION: Position of CDR1
<220> FEATURE:
<221> NAME/KEY: MISC_FEATURE
<222> LOCATION: (50)..(66)
<223> OTHER INFORMATION: Position of CDR2
<220> FEATURE:
<221> NAME/KEY: MISC_FEATURE
<222> LOCATION: (99)..(116)
<223> OTHER INFORMATION: Position of CDR3
<220> FEATURE:
<221> NAME/KEY: MISC_FEATURE
<222> LOCATION: (128)..(225)
<223> OTHER INFORMATION: Position of CH1
<220> FEATURE:
<221> NAME/KEY: MISC_FEATURE
<222> LOCATION: (226)..(240)
<223> OTHER INFORMATION: Position of hinge
<220> FEATURE:
<221> NAME/KEY: MISC_FEATURE
<222> LOCATION: (241)..(350)
<223> OTHER INFORMATION: Position of CH2
<220> FEATURE:
<221> NAME/KEY: MISC_FEATURE
<222> LOCATION: (241)..(249)
```

```
<223> OTHER INFORMATION: Position of the Fc receptor binding regions
<220> FEATURE:
<221> NAME/KEY: MISC_FEATURE
<222> LOCATION: (274)..(280)
<223> OTHER INFORMATION: Position of the Fc receptor binding regions
<220> FEATURE:
<221> NAME/KEY: MISC_FEATURE
<222> LOCATION: (304)..(309)
<223> OTHER INFORMATION: Position of the Fc receptor binding regions
<220> FEATURE:
<221> NAME/KEY: MISC_FEATURE
<222> LOCATION: (335)..(342)
<223> OTHER INFORMATION: Position of the Fc receptor binding regions
<220> FEATURE:
<221> NAME/KEY: MISC_FEATURE
<222> LOCATION: (351)..(457)
<223> OTHER INFORMATION: Position of CH3

<400> SEQUENCE: 1

Gln Val Gln Leu Val Gln Ser Gly Ala Glu Val Lys Lys Pro Gly Ala
1               5                   10                  15

Ser Val Lys Val Ser Cys Gln Ala Ser Gly Tyr Arg Phe Ser Asn Phe
            20                  25                  30

Val Ile His Trp Val Arg Gln Ala Pro Gly Gln Arg Phe Glu Trp Met
        35                  40                  45

Gly Trp Ile Asn Pro Tyr Asn Gly Asn Lys Glu Phe Ser Ala Lys Phe
    50                  55                  60

Gln Asp Arg Val Thr Phe Thr Ala Asp Thr Ser Ala Asn Thr Ala Tyr
65                  70                  75                  80

Met Glu Leu Arg Ser Leu Arg Ser Ala Asp Thr Ala Val Tyr Tyr Cys
                85                  90                  95

Ala Arg Val Gly Pro Tyr Ser Trp Asp Asp Ser Pro Gln Asp Asn Tyr
            100                 105                 110

Tyr Met Asp Val Trp Gly Lys Gly Thr Thr Val Ile Val Ser Ser Ala
        115                 120                 125

Ser Thr Lys Gly Pro Ser Val Phe Pro Leu Ala Pro Ser Ser Lys Ser
    130                 135                 140

Thr Ser Gly Gly Thr Ala Ala Leu Gly Cys Leu Val Lys Asp Tyr Phe
145                 150                 155                 160

Pro Glu Pro Val Thr Val Ser Trp Asn Ser Gly Ala Leu Thr Ser Gly
                165                 170                 175

Val His Thr Phe Pro Ala Val Leu Gln Ser Ser Gly Leu Tyr Ser Leu
            180                 185                 190

Ser Ser Val Val Thr Val Pro Ser Ser Ser Leu Gly Thr Gln Thr Tyr
        195                 200                 205

Ile Cys Asn Val Asn His Lys Pro Ser Asn Thr Lys Val Asp Lys Lys
    210                 215                 220

Ala Glu Pro Lys Ser Cys Asp Lys Thr His Thr Cys Pro Pro Cys Pro
225                 230                 235                 240

Ala Pro Glu Leu Leu Gly Gly Pro Ser Val Phe Leu Phe Pro Pro Lys
                245                 250                 255

Pro Lys Asp Thr Leu Met Ile Ser Arg Thr Pro Glu Val Thr Cys Val
            260                 265                 270

Val Val Asp Val Ser His Glu Asp Pro Glu Val Lys Phe Asn Trp Tyr
        275                 280                 285

Val Asp Gly Val Glu Val His Asn Ala Lys Thr Lys Pro Arg Glu Glu
    290                 295                 300

Gln Tyr Asn Ser Thr Tyr Arg Val Val Ser Val Leu Thr Val Leu His
305                 310                 315                 320
```

Gln Asp Trp Leu Asn Gly Lys Glu Tyr Lys Cys Lys Val Ser Asn Lys
                325                 330                 335

Ala Leu Pro Ala Pro Ile Glu Lys Thr Ile Ser Lys Ala Lys Gly Gln
                340                 345                 350

Pro Arg Glu Pro Gln Val Tyr Thr Leu Pro Pro Ser Arg Asp Glu Leu
            355                 360                 365

Thr Lys Asn Gln Val Ser Leu Thr Cys Leu Val Lys Gly Phe Tyr Pro
        370                 375                 380

Ser Asp Ile Ala Val Glu Trp Glu Ser Asn Gly Gln Pro Glu Asn Asn
385                 390                 395                 400

Tyr Lys Thr Thr Pro Pro Val Leu Asp Ser Asp Gly Ser Phe Phe Leu
                405                 410                 415

Tyr Ser Lys Leu Thr Val Asp Lys Ser Arg Trp Gln Gln Gly Asn Val
            420                 425                 430

Phe Ser Cys Ser Val Met His Glu Ala Leu His Asn His Tyr Thr Gln
        435                 440                 445

Lys Ser Leu Ser Leu Ser Pro Gly Lys
    450                 455

<210> SEQ ID NO 2
<211> LENGTH: 444
<212> TYPE: PRT
<213> ORGANISM: Mus musculus
<220> FEATURE:
<221> NAME/KEY: MISC_FEATURE
<222> LOCATION: (31)..(35)
<223> OTHER INFORMATION: Position of CDR1
<220> FEATURE:
<221> NAME/KEY: MISC_FEATURE
<222> LOCATION: (50)..(66)
<223> OTHER INFORMATION: Position of CDR2
<220> FEATURE:
<221> NAME/KEY: MISC_FEATURE
<222> LOCATION: (99)..(109)
<223> OTHER INFORMATION: Position of CDR3
<220> FEATURE:
<221> NAME/KEY: MISC_FEATURE
<222> LOCATION: (121)..(217)
<223> OTHER INFORMATION: Position of CH1
<220> FEATURE:
<221> NAME/KEY: MISC_FEATURE
<222> LOCATION: (218)..(230)
<223> OTHER INFORMATION: Position of hinge
<220> FEATURE:
<221> NAME/KEY: MISC_FEATURE
<222> LOCATION: (231)..(337)
<223> OTHER INFORMATION: Position of CH2
<220> FEATURE:
<221> NAME/KEY: MISC_FEATURE
<222> LOCATION: (262)..(262)
<223> OTHER INFORMATION: Position of the Fc receptor binding region
<220> FEATURE:
<221> NAME/KEY: MISC_FEATURE
<222> LOCATION: (338)..(444)
<223> OTHER INFORMATION: Position of CH3

<400> SEQUENCE: 2

Gln Val Gln Leu Gln Gln Pro Gly Ala Glu Leu Val Lys Pro Gly Ala
1               5                   10                  15

Ser Val Lys Leu Ser Cys Lys Ala Ser Gly Tyr Thr Phe Thr Thr Tyr
            20                  25                  30

Tyr Leu Tyr Trp Val Arg Gln Arg Pro Gly Gln Gly Leu Glu Trp Ile
        35                  40                  45

Gly Gly Ile Asn Pro Ser Asn Gly Gly Thr Asn Phe Asn Glu Lys Phe
    50                  55                  60

-continued

```
Lys Ser Lys Ala Thr Leu Thr Val Asp Lys Ser Ser Thr Ala Tyr
 65                  70                  75                  80

Met Gln Leu Asn Ser Leu Thr Ser Glu Asp Ser Ala Val Tyr Tyr Cys
                 85                  90                  95

Thr Arg Arg Asp Tyr Arg Tyr Asp Arg Gly Phe Asp Tyr Trp Gly Gln
            100                 105                 110

Gly Thr Ser Val Thr Val Ser Ser Ala Lys Thr Thr Pro Pro Ser Val
        115                 120                 125

Tyr Pro Leu Ala Pro Gly Ser Ala Ala Gln Thr Asn Ser Met Val Thr
    130                 135                 140

Leu Gly Cys Leu Val Lys Gly Tyr Phe Pro Glu Pro Val Thr Val Thr
145                 150                 155                 160

Trp Asn Ser Gly Ser Leu Ser Ser Gly Val His Thr Phe Pro Ala Val
                165                 170                 175

Leu Gln Ser Asp Leu Tyr Thr Leu Ser Ser Ser Val Thr Val Pro Ser
            180                 185                 190

Ser Pro Arg Pro Ser Glu Thr Val Thr Cys Asn Val Ala His Pro Ala
        195                 200                 205

Ser Ser Thr Lys Val Asp Lys Lys Ile Val Pro Arg Asp Cys Gly Cys
    210                 215                 220

Lys Pro Cys Ile Cys Thr Val Pro Glu Val Ser Ser Val Phe Ile Phe
225                 230                 235                 240

Pro Pro Lys Pro Lys Asp Val Leu Thr Ile Thr Leu Thr Pro Lys Val
                245                 250                 255

Thr Cys Val Val Val Asp Ile Ser Lys Asp Asp Pro Glu Val Gln Phe
            260                 265                 270

Ser Trp Phe Val Asp Asp Val Glu Val His Thr Ala Gln Thr Gln Pro
        275                 280                 285

Arg Glu Glu Gln Phe Asn Ser Thr Phe Arg Ser Val Ser Glu Leu Pro
    290                 295                 300

Ile Met His Gln Asp Trp Leu Asn Gly Lys Glu Phe Lys Cys Arg Val
305                 310                 315                 320

Asn Ser Ala Ala Phe Pro Ala Pro Ile Glu Lys Thr Ile Ser Lys Thr
                325                 330                 335

Lys Gly Arg Pro Lys Ala Pro Gln Val Tyr Thr Ile Pro Pro Pro Lys
            340                 345                 350

Glu Gln Met Ala Lys Asp Lys Val Ser Leu Thr Cys Met Ile Thr Asp
        355                 360                 365

Phe Phe Pro Glu Asp Ile Thr Val Glu Trp Gln Trp Asn Gly Gln Pro
    370                 375                 380

Ala Glu Asn Tyr Lys Asn Thr Gln Pro Ile Met Asn Thr Asn Gly Ser
385                 390                 395                 400

Tyr Phe Val Tyr Ser Lys Leu Asn Val Gln Lys Ser Asn Trp Glu Ala
                405                 410                 415

Gly Asn Thr Phe Thr Cys Ser Val Leu His Glu Gly Leu His Asn His
            420                 425                 430

His Thr Glu Lys Ser Leu Ser His Ser Pro Gly Lys
        435                 440
```

<210> SEQ ID NO 3
<211> LENGTH: 50
<212> TYPE: PRT
<213> ORGANISM: Mus musculus

```
<400> SEQUENCE: 3

Arg Thr Thr Met Leu Pro Ser Thr Pro His Ile Thr Ala Pro Ser Thr
1               5                   10                  15

Ser Glu Ala Gln Asn Ala Ser Pro Ser Val Ser Val Gly Ser Gly Thr
                20                  25                  30

Val Asp Ser Lys Glu Thr Ile Ser Pro Trp Gly Gln Thr Thr Ile Pro
            35                  40                  45

Val Ser
    50

<210> SEQ ID NO 4
<211> LENGTH: 30
<212> TYPE: PRT
<213> ORGANISM: Mus musculus

<400> SEQUENCE: 4

Arg Thr Thr Met Leu Pro Ser Thr Pro His Ile Thr Ala Pro Ser Thr
1               5                   10                  15

Ser Glu Ala Gln Asn Ala Ser Pro Ser Val Ser Val Gly Ser
                20                  25                  30

<210> SEQ ID NO 5
<211> LENGTH: 50
<212> TYPE: PRT
<213> ORGANISM: Homo sapiens

<400> SEQUENCE: 5

Ser Thr Thr Ala Val Gln Thr Pro Thr Ser Gly Glu Pro Leu Val Ser
1               5                   10                  15

Thr Ser Glu Pro Leu Ser Ser Lys Met Tyr Thr Thr Ser Ile Thr Ser
                20                  25                  30

Asp Pro Lys Ala Asp Ser Thr Gly Asp Gln Thr Ser Ala Leu Pro Pro
            35                  40                  45

Ser Thr
    50

<210> SEQ ID NO 6
<211> LENGTH: 23
<212> TYPE: PRT
<213> ORGANISM: Homo sapiens

<400> SEQUENCE: 6

Ser Thr Thr Ala Val Gln Thr Pro Thr Ser Gly Glu Pro Leu Val Ser
1               5                   10                  15

Thr Ser Glu Pro Leu Ser Ser
                20

<210> SEQ ID NO 7
<211> LENGTH: 67
<212> TYPE: PRT
<213> ORGANISM: Artificial Sequence
<220> FEATURE:
<223> OTHER INFORMATION: Synthetic peptide insert incorporating sequence
      derived from mouse CD43 flanked by hinge sequence

<400> SEQUENCE: 7

Val Pro Arg Asp Cys Gly Ser Arg Thr Thr Met Leu Pro Ser Thr Pro
1               5                   10                  15

His Ile Thr Ala Pro Ser Thr Ser Glu Ala Gln Asn Ala Ser Pro Ser
                20                  25                  30
```

```
Val Ser Val Gly Ser Gly Thr Val Asp Ser Lys Glu Thr Ile Ser Pro
            35                  40                  45

Trp Gly Gln Thr Thr Ile Pro Val Ser Gly Ser Gly Cys Lys Pro Cys
        50                  55                  60

Ile Cys Thr
65

<210> SEQ ID NO 8
<211> LENGTH: 47
<212> TYPE: PRT
<213> ORGANISM: Artificial Sequence
<220> FEATURE:
<223> OTHER INFORMATION: Synthetic peptide insert incorporating sequence
      derived from mouse CD43 flanked by hinge sequence

<400> SEQUENCE: 8

Val Pro Arg Asp Cys Gly Ser Arg Thr Thr Met Leu Pro Ser Thr Pro
1               5                   10                  15

His Ile Thr Ala Pro Ser Thr Ser Glu Ala Gln Asn Ala Ser Pro Ser
            20                  25                  30

Val Ser Val Gly Ser Gly Ser Gly Cys Lys Pro Cys Ile Cys Thr
            35                  40                  45
```

MODIFIED ANTIBODIES

CROSS-REFERENCE

This application is a U.S. National Stage entry under 35 U.S.C. § 371 of International Application No. PCT/GB2019/053570, filed Dec. 17, 2019, which claims the benefit of United Kingdom Application No. 1820547.6, filed 17 Dec. 2018, each of which is incorporated herein by reference in its entirety.

FIELD OF THE INVENTION

This invention relates generally to methods and approaches for reducing the agonistic activity of an antibody or antigen binding fragment thereof, and to such modified antibodies.

BACKGROUND

Decisions leading to lymphocyte activation and survival are determined not just by antigen recognition but also by the integration of signals from activating or inhibitory co-receptors that attune cells to their environment. Understanding these processes has led to the development of immunosuppressive antibodies that mask the ligands of activating receptors, such as CD28, and to 'checkpoint inhibitors', that enhance anti-tumour responses by binding to inhibitory receptors, such as PD-1, blocking the engagement of natural ligands. Blocking ligand engagement is thought to prevent signaling by the checkpoint receptors.

However, the finding made in animal tumour models that blocking immune checkpoint antibodies is not as effective at preventing tumour growth as deletion of the PD-1 gene entirely (U.S. Pat. No. 7,595,048), suggests that antibodies are not wholly effective at preventing signaling.

The first blocking antibodies made against human PD-1 were observed to have potent agonistic activity (see WO/2004/056875; Bennett et al., J Immunol. 170, 711-8, 2003). However, there are circumstances when agonistic antibodies overly activate target receptor signaling, as occurred in the case of the anti-CD28 antibody TGN1412 (Attarwala, J Young Pharm. 2, 332-6, 2010). Therefore, there is a need for modified antibodies with attenuated agonistic activity.

BRIEF SUMMARY OF THE DISCLOSURE

The disclosure is based, inter alia, on the unexpected discovery that the agonistic activity of an antibody is mediated, at least in part, from the antibody mediated exclusion of phosphatases from regions of contact formed between a lymphocyte and a target cell. The inventors further discovered that the agonistic activity of an antibody can be reduced by increasing the size of the antibody such that the large phosphatases are less or no longer excluded. Such antibody modifications can be used, inter alia, to reduce the agonistic activity of blocking antibodies.

In certain circumstances an agonist antibody can overly activate target receptor signaling, as occurred in the case of the anti-CD28 antibody TGN1412 (Attarwala, J Young Pharm. 2, 332-6, 2010). In these circumstances, the agonistic antibody is too effective at excluding phosphatases. This "superagonist" effect can be attenuated by increasing the overall dimensions of the antibody to avoid the exclusion of phosphatases and dampen the agonistic activity of the antibody.

Disclosed herein are extended antibodies that allow limited re-entry of phosphatases into the contact containing the receptor-bound antibody, such that the amount of signaling is reduced in a controlled manner. The present disclosure thus allows the design of an extended antibody with optimal therapeutic activity.

Fc receptor (FcR)-binding forms of the extended antibodies disclosed herein will actively sequester receptors away from the close contact formed by other molecules, typically eliminating completely agonistic effects, which is not possible using an approach that would only eliminate FcR binding. There may also be significant additional benefits from checkpoint blocking antibodies that bind to cell surfaces via FcRs (or other engineered ligands), in terms of specificity or half-life of blockade, or because they could be used, e.g. to exclude inhibitory FcRs from the close contact.

The disclosure is further based, inter alia, on the discovery that the ligand-independent agonistic activities of both activating (e.g. anti-CD28) and inhibitory (e.g. anti-PD-1) antibodies can be substantially reduced by making the antibodies larger through insertion of a spacer moiety between the antigen-binding site and the Fc receptor binding site (e.g. in the antigen-binding fragment (Fab) variable/constant region interface, Fab constant region or hinge region). In certain embodiments, the spacer moiety is a polypeptide that adopts a rigid conformation so as to increase the size of the antibody and spatially separate the antigen-binding and Fc receptor binding sites of the antibody. Such molecules can retain their antigen-binding and, if desired, FcR binding properties but by increasing the size/length of the antibody, these molecules typically have reduced agonistic (with antagonist antibodies) and superagonistic (with agonist antibodies) activity. Without wishing to be bound by theory, it is believed that the enhanced size of the antibody means that binding to the target receptor blocks ligand binding and results in the exclusion of the receptor from the close contact between the target cell (e.g. cancer cell) and T cell (see FIG. 1), where the receptor would otherwise initiate signaling. The ability to reduce (minimize or eliminate) signaling in both of these ways is highly desirable for clinical use antibodies.

Data suggest that antibodies act as agonists if they engage receptors within a cell-cell contact that is sufficiently close (i.e. a "close contact") to exclude large membrane bound receptor-type protein tyrosine phosphatases (RPTPs) [https://ora.ox.ac.uk/objects/uuid: 1c97e755-e61d-4d55-8b20-b2546c826eee]. The theoretical basis for this understanding derives from the kinetic-segregation model (Davis and van der Merwe, Nat Immunol 7, 803-809, 2006). The key requirement of the mechanism applied to antibodies is that the complex formed by the antibody and the receptor must be smaller (in a direction orthogonal to the plane of the cell surface) than the smallest RPTP expressed by the lymphocyte, for example CD45R0, which is about 216 Å (Chang et al., Nat Immunol. 17, 574-82, 2016). If the antibody binds to Fc receptors as well as its target receptor (FIG. 1a), it is predicted that strong signaling will ensue because the receptor will be held in the phosphatase-depleted contact. However, the inventors predict that even antibodies that don't bind to Fc receptors, could in principle form complexes small enough to reside in phosphatase-excluding gaps created by other molecules, such as small adhesion proteins, thereby allowing continued signaling (FIG. 1b).

The preceding implies that most if not all antibodies that bind small receptors such as PD-1 will have some degree of agonistic activity because the complexes they form with their targets, with or without FcR engagement, are smaller than about 216 Å. This will blunt the effectiveness of antibodies used as blockers of signaling.

As used herein, a close contact is the region of close membrane apposition at the interface between two interacting cells, created by the interactions of local adhesion molecules across the contact. The close apposition of the membranes at the close contact is responsible for excluding the phosphatases.

All of the agonisable receptors we are discussing have tyrosine-containing phosphorylation motifs (i.e. immunoreceptor tyrosine-based activation motifs and immunoreceptor tyrosine-based inhibition motifs (ITIMs), etc), which include Fc receptors. The inventors are proposing that these are all triggered by phosphatase exclusion. The ability of the extended antibody to also engage Fc receptors means that these receptors could potentially be excluded from the close contact, bi-directionally altering signaling potential.

According to a first aspect of the invention there is provided an antibody variant/construct molecule comprising (i) an Fc receptor binding site, (ii) an antigen-binding site and (iii) a spacer moiety located between (i) and (ii), wherein the spacer moiety serves to increase the distance between (i) and (ii) so as to reduce the agonistic activity of the molecule as compared to the antibody variant that lacks (iii).

In a particular embodiment, the introduction of the spacer moiety increases the overall dimensions of the molecule.

In a particular embodiment, a spacer moiety is located in the constant region between the antigen-binding site and the Fc receptor binding site.

In a particular embodiment, a spacer moiety is located in the hinge region of the antibody.

In particular embodiments, the spacer moiety is a rigid spacer moiety, such as a mucin or mucin-like polypeptide sequence, and inclusion of the spacer moiety increases the length and/or overall dimensions of the antibody.

In a particular embodiment, the increased size of the antibody variant/construct that results from inclusion of the spacer moiety causes the Fc receptor binding site of the antibody variant to be sequestered away from the close contact when the antibody variant is bound to its antigen. In other words, when the antibody variant is bound to the antigen (e.g. receptor) it is sterically excluded from the contact between the cells which results in reduced signaling by the antibody-engaged receptor.

In a particular embodiment, the increased size of the antibody variant/construct that results from inclusion of the spacer moiety positions the Fc receptor binding site of the antibody variant further from the membrane when the antibody variant is bound to its antigen.

According to a second aspect of the invention there is provided one or more nucleic acid molecules that encode an antibody variant/construct in accordance with any of the first to fourth aspects of the invention. In a variant of this aspect there is provided a nucleic acid molecule comprising a sequence encoding an antibody variant in accordance with any of the first to fourth aspects of the invention.

According to a third aspect of the invention there is provided a vector comprising the nucleic acid of the second aspect of the invention.

According to a fourth aspect of the invention there is provided a host cell comprising the nucleic acid sequence according to the second aspect of the invention or the vector according to third aspect of the invention.

According to a fifth aspect of the invention there is provided a method of producing an antibody variant/construct in accordance with the first aspect of the invention, the method comprising expressing the nucleic acid(s) in accordance with the second aspect of the invention in a host cell.

According to a sixth aspect of the invention there is provided a method for preparing an antibody variant/construct in accordance with the first aspect of the invention, comprising identifying the nucleic acid sequences encoding an antibody of interest and modifying said nucleic acid sequences to encode a variant of the antibody of interest which variant comprises a polypeptide spacer moiety introduced so as to encode an antibody variant according to the first aspect of the invention.

According to a seventh aspect of the invention there is provided a method for reducing the agonistic activity of an antibody, comprising introducing a spacer moiety into the antibody that increases the distance between the Fc receptor binding site and the antigen-binding site of the molecule. In a particular embodiment the spacer moiety is inserted in the antibody hinge region. In a particular embodiment the spacer moiety is a rigid spacer moiety.

According to an eighth aspect of the invention there is provided a pharmaceutical composition comprising an antibody variant/construct according to the first aspect of the invention and at least one pharmaceutically acceptable excipient.

Antibody variants or pharmaceutical compositions of the invention may be used as medicaments.

Suitable examples of diseases for treatment with the medicaments are considered elsewhere in the specification.

According to a ninth aspect of the invention there is provided an antibody variant in accordance with the first aspect of the invention or the pharmaceutical composition in accordance with the eighth aspect of the invention for use in therapy. In a particular embodiment, the therapy is treatment of cancer.

According to a tenth aspect of the invention there is provided a method of treating a patient in need thereof, comprising administering an antibody variant in accordance with the first aspect of the invention or the pharmaceutical composition in accordance with the eighth aspect of the invention. In a particular embodiment, the method is for treating cancer. In another embodiment, the method of treating cancer comprises administering to a patient in need thereof an antibody variant molecule that has been adapted to minimize/lack agonistic activity by extension of the molecule to maximize its exclusion from the close contact, or a pharmaceutical composition thereof. In a particular embodiment, the extension is caused by inclusion of a rigid spacer moiety into the antibody.

DETAILED DESCRIPTION

As used in this specification and the appended claims, the singular forms "a", "an" and "the" include plural referents unless the content clearly dictates otherwise. Thus, for example, reference to "a molecule" optionally includes a combination of two or more such molecules, and the like.

It is understood that wherever aspects are described herein with the language "comprising", otherwise analogous aspects described in terms of "consisting of" and/or "consisting essentially of" are also provided.

It is to be understood that one, some, or all of the properties of the various embodiments described herein may be applied to any aspect unless the content clearly dictates otherwise. Furthermore, that the various embodiments may be combined to form other embodiments of the present invention. These and other aspects of the invention will become apparent to one of skill in the art. These and other embodiments of the invention are further described by the detailed description that follows.

Unless defined otherwise, all technical and scientific terms used herein have the same meaning as commonly understood by one of ordinary skill in the art to which this disclosure is related. For example, the Concise Dictionary of Biomedicine and Molecular Biology, Juo, Pei-Show, 2nd ed., 2002, CRC Press; The Dictionary of Cell and Molecular Biology, 3rd ed., 1999, Academic Press; and the Oxford Dictionary of Biochemistry and Molecular Biology, Revised, 2000, Oxford University Press, provide one of ordinary skill with a general dictionary of many of the terms used in this disclosure.

The term "about" as used herein refers to the usual error range for the respective value readily known to the skilled person in this technical field. Reference to "about" a value or parameter herein includes (and describes) embodiments that are directed to that value or parameter per se.

As is known in the art, a polypeptide is a continuous, unbranched chain of amino acids linked by peptide (amide) bonds.

The inventors have discovered that the agonistic activity of an antibody results from its exclusion of phosphatases from regions of contact formed by a lymphocyte and its target cell. Provided herein are embodiments wherein this agonistic activity can be reduced if the size of the antibody molecule is increased such that the large phosphatases are no longer excluded or are less excluded. This is expected to reduce the agonistic activity of blocking antibodies.

There may also be circumstances when there is too much signaling by an antibody that is known to be an agonist, as occurred in the case of the anti-CD28 antibody TGN1412 (Attarwala, J Young Pharm. 2, 332-6, 2010). In this case the agonist might be too effective at excluding phosphatases.

The inventors have provided structural features and techniques for antibody modification to attenuate this "super-agonist" effect by increasing the overall dimensions of the antibody to once again avoid the exclusion of phosphatases.

By creating antibodies that allow limited re-entry of phosphatases into the contact containing the receptor-bound antibody, the amount of signaling could be reduced in a controlled manner. The present invention thus provides methods and compositions for design of an antibody with optimal therapeutic activity.

Fc receptor (FcR)-binding forms of the extended antibodies of the invention can in some embodiments, actively sequester receptors away from the close contact formed by other molecules, typically eliminating completely the signaling of the receptors (see FIG. 1), which is not possible using an approach that would only eliminate FcR binding. There may also be significant additional benefits from checkpoint blocking antibodies that bind to cell surfaces via FcRs (or other engineered ligands), in terms of specificity or half-life of blockade, or because they could be used, e.g. to exclude inhibitory FcRs from the close contact.

Antibodies

An antibody is an immunoglobulin molecule capable of specific binding to a target, such as a carbohydrate, polynucleotide, lipid, polypeptide, etc., through at least one antigen recognition site, located in the variable domain of the immunoglobulin molecule. There are five major classes (i.e. isotypes) of immunoglobulins: IgA, IgD, IgE, IgG, and IgM, and several of these may be further divided into subclasses (subtypes), e.g. IgG1, IgG2, IgG3, IgG4, IgA1 and 1gA2. The heavy-chain constant regions that correspond to the different classes of immunoglobulins are called alpha, delta, epsilon, gamma, and mu, respectively. The subunit structures and three-dimensional configurations of different classes of immunoglobulins are well known. Unless dictated otherwise by contextual constraints the term further comprises all classes and subclasses of antibodies. Heavy-chain constant domains that correspond to the different classes of antibodies are typically denoted by the corresponding lower-case Greek letter $\alpha$, $\delta$, $\epsilon$, $\gamma$, and $\mu$, respectively. Light chains of the antibodies from any vertebrate species can be assigned to one of two clearly distinct types, called kappa ($\kappa$) and lambda ($\lambda$), based on the amino acid sequences of their constant domains.

"Native antibodies" are usually heterotetrameric Y-shaped glycoproteins of about 150,000 daltons, composed of two identical light (L) chains and two identical heavy (H) chains. Each light chain is linked to a heavy chain by one covalent disulfide bond, while the number of disulfide linkages varies among the heavy chains of different immunoglobulin isotypes. Each heavy and light chain also has regularly spaced intrachain disulfide bridges. Each heavy chain has at one end a variable domain (VH) followed by a number of constant domains. Each light chain has a variable domain at one end (VL) and a constant domain at its other end; the constant domain of the light chain is aligned with the first constant domain of the heavy chain, and the light chain variable domain is aligned with the variable domain of the heavy chain. Particular amino acid residues are believed to form an interface between the light chain and heavy chain variable domains. Each heavy chain comprises one variable domain (VH) and a constant region, which in the case of IgG, IgA, and IgD antibodies, comprises three domains termed $C_H1$, $C_H2$, and $C_H3$ (IgM and IgE have a fourth domain, $C_H4$). In IgG, IgA, and IgD classes, the $C_H1$ and $C_H2$ domains are separated by a flexible hinge region, which is a proline and cysteine rich segment of variable length (from about 10 to about 60 amino acids in various IgG subclasses). The variable domains in both the light and heavy chains are joined to the constant domains by a "J" region of about 12 or more amino acids and the heavy chain also has a "D" region of about 10 additional amino acids. Each class of antibody further comprises inter-chain and intra-chain disulfide bonds formed by paired cysteine residues. The heavy chain variable region (YH) and light chain variable region (YL) can each be further subdivided into regions of hypervariability, termed complementarity determining regions (CDRs), interspersed with regions that are more conserved, termed framework regions (FR). Each YH and YL, comprises three CDRs and four FRs, arranged from amino-terminus to carboxy-terminus in the following order: FR1, CDR1, FR2, CDR2, FR3, CDR3, FR4. The variable regions of the heavy and light chains contain a binding domain that interacts with an antigen. The constant regions of the antibodies may mediate the binding of the immunoglobulin to host tissues or factors, including various cells of the immune system (e.g. effector cells) and the first component (Clq) of the classical complement system.

The term "antibody" as used herein, refers to an immunoglobulin molecule which specifically binds to an antigen. The term also covers any polypeptide or protein comprising an antibody antigen-binding site and an Fc receptor binding site, which may or may not be functional. An antibody variant of the invention is one that has been modified to possess a spacer moiety as described herein.

The antibody variant of the invention may be from any animal species including murine, rat, human, or any other origin (including chimeric or humanized antibodies). In some embodiments, the antibody variant is a monoclonal antibody. In some embodiments, the antibody variant is a human or humanized antibody. A non-human antibody variant may be humanized by recombinant methods to reduce its immunogenicity in man.

Whilst it is possible to select an existing "parent" antibody (e.g. monoclonal antibody) to modify to create an antibody variant of the invention, it will be appreciated that a synthetic antibody can be designed that has the desired antigen-binding properties, which may, for example, have been selected using phage display or other antigen-binding selection or panning approach, incorporated into an antibody frame (e.g. fused to the constant and hinge regions of, for example, an IgG1 or IgG4 molecule), and wherein the spacer moiety has been introduced.

The term "monoclonal antibody" ("mAb") as used herein refers to an antibody obtained from a population of substantially homogeneous antibodies, e.g. the individual antibodies comprising the population are identical except for possible mutations, e.g. naturally occurring mutations, that may be present in minor amounts. Thus, the modifier "monoclonal" indicates the character of the antibody as not being a mixture of discrete antibodies. A mAb is highly specific, being directed against a single antigenic site/epitope.

A mAb may be produced by hybridoma, recombinant, transgenic or other techniques known to those skilled in the art. For example, a monoclonal antibody or antigen-binding fragment thereof in accordance with the present invention may be made by the hybridoma method first described by Kohler and Milstein (Nature 256:495, 1975) or may be made by recombinant DNA methods such as described in U.S. Pat. Nos. 4,816,567 and 6,331,415. The "monoclonal antibodies" may also be isolated from phage antibody libraries using the techniques described in Clackson et al., *Nature* 1991; 352:624-628 and Marks et al., *J. Mol. Biol.* 1991; 222:581-597, for example.

A "human" antibody (HuMAb) refers to an antibody having variable regions in which both the framework and CDR regions are derived from human germline immunoglobulin sequences. Furthermore, if the antibody contains a constant region, the constant region is also derived from human germline immunoglobulin sequences. The human antibodies may include amino acid residues not encoded by human germline immunoglobulin sequences (e.g. mutations introduced by random or site-specific mutagenesis in vitro or by somatic mutation in vivo). However, the term "human antibody", as used herein, is not intended to include antibodies in which CDR sequences derived from the germline of another mammalian species, such as a mouse, have been grafted onto human framework sequences.

Human antibodies can be prepared by administering an immunogen/antigen to a transgenic animal that has been modified to produce intact human antibodies or intact antibodies with human variable regions in response to antigenic challenge, but whose endogenous loci have been disabled, e.g. immunized xenomice (see, e.g., U.S. Pat. Nos. 6,075,181 and 6,150,584 regarding XENOMOUSE™ technology). See also, for example, Li et al. (Proc. Natl. Acad. Sci. USA 103:3557-3562, 2006) regarding human antibodies generated via a human B-cell hybridoma technology. Such animals typically contain all or a portion of the human immunoglobulin loci, which replace the endogenous immunoglobulin loci, or which are present extra-chromosomally or integrated randomly into the animal's chromosomes. In such transgenic mice, the endogenous immunoglobulin loci have generally been inactivated. For review of methods for obtaining human antibodies from transgenic animals, see Lonberg (Nat. Biotech. 23:1117-1125, 2005). See also, e.g., U.S. Pat. Nos. 6,075,181 and 6,150,584 describing XENOMOUSE™ technology; U.S. Pat. No. 5,770,429 describing HUMAB™ technology; U.S. Pat. No. 7,041,870 describing K-M MOUSE™ technology, and U.S. Patent Application Publication No. US2007/0061900, describing VELOCIMOUSE™ technology. Human variable regions from intact antibodies generated by such animals may be further modified, e.g. by combining with a different human constant region.

Human antibodies can also be made by hybridoma-based methods. Human myeloma and mouse-human heteromyeloma cell lines for the production of human monoclonal antibodies have been described. (See, e.g., Kozbor, J. Immunol, 133:3001 (1984); Brodeur et al., Monoclonal Antibody Production Techniques and Applications, pp. 51-63 (Marcel Dekker, Inc., New York, 1987); and Boerner et al., J. Immunol., 147:86 (1991).) Human antibodies generated via human B-cell hybridoma technology are also described in Li et al., Proc. Natl. Acad. Sci. USA, 103:3557-3562 (2006). Additional methods include those described, for example, in U.S. Pat. No. 7,189,826 (describing production of monoclonal human IgM antibodies from hybridoma cell lines) and Ni, Xiandai Mianyixue, 26 (4): 265-268 (2006) (describing human-human hybridomas). Human hybridoma technology (Trioma technology) is also described in Vollmers and Brandlein, Histology and Histopathology, 20 (3): 927-937 (2005) and Vollmers and Brandlein, Methods and Findings in Experimental and Clinical Pharmacology, 27 (3): 185-91 (2005).

The terms "human" antibodies and "fully human" antibodies are used synonymously. This definition of a human antibody specifically excludes a humanized antibody comprising non-human antigen-binding residues.

As used herein, a "humanized antibody" refers to an antibody in which some, most or all of the amino acids outside the CDR domains of a non-human antibody are replaced with corresponding amino acids derived from human immunoglobulins. In some embodiments, humanized antibodies are human immunoglobulins (recipient antibody) in which residues from a CDR of the recipient are replaced by residues from a CDR of a non-human species (donor antibody) such as mouse, rat, or rabbit having the desired specificity, affinity, and capacity. The humanized antibody may comprise residues that are found neither in the recipient antibody nor in the imported CDR or framework sequences but are included to further refine and optimize antibody performance. In one embodiment of a humanized form of an antibody, some, most or all the amino acids outside the CDR domains have been replaced with amino acids from human immunoglobulins, whereas some, most or all amino acids within one or more CDR regions are unchanged. Small additions, deletions, insertions, substitutions or modifications of amino acids are permissible provided they do not abrogate the ability of the antibody to bind to a particular antigen. A "humanized" antibody retains an antigenic specificity similar to that of the original antibody. In general, a humanized antibody will comprise substantially all of at least one, and typically two, variable domains, in which all or substantially all of the hypervariable loops correspond to those of a non-human immunoglobulin, and all or substantially all of the FRs are those of a human immunoglobulin sequence. The humanized antibody optionally will also comprise at least a portion of an immunoglobulin constant region (Fc), typically that of a human immunoglobulin. For further details, see, e.g., Jones et al., Nature 321:522-525 (1986); Riechmann et al., Nature 332:323-329 (1988); and Presta, Curr. Op. Struct. Biol. 2:593-596 (1992). See also, e.g., Vaswani and Hamilton, Ann. Allergy, Asthma & Immunol. 1:105-115 (1998); Harris, Biochem. Soc. Transactions 23:1035-1038 (1995); Hurle and Gross, Curr. Op. Biotech. 5:428-433 (1994); and U.S. Pat. Nos. 6,982,321 and 7,087,409.

A "chimeric antibody" refers to an antibody in which the variable regions are derived from one species and the constant regions are derived from another species, such as an antibody in which the variable regions are derived from a mouse antibody and the constant regions are derived from a human antibody, or vice versa. The term also encompasses an antibody comprising a variable region from one individual from one species (e.g. a first mouse) and a constant region from another individual from the same species (e.g. a second mouse).

The term "antigen (Ag)" refers to the molecular entity used for immunization of an immunocompetent vertebrate to produce the antibody (Ab) that recognizes the Ag or to screen an expression library (e.g. phage, yeast or ribosome display library, among others). Herein, Ag is termed more broadly and is generally intended to include target molecules that are specifically recognized by the Ab, thus including portions or mimics of the molecule used in an immunization process for raising the Ab or in library screening for selecting the Ab.

A "bispecific" or "bifunctional" antibody is an artificial hybrid antibody having two different heavy/light chain pairs and two different binding sites. Traditionally, the recombinant production of bispecific antibodies is based on the co-expression of two immunoglobulin heavy-chain/light-chain pairs, where the two heavy chains have different specificities (Milstein and Cuello, Nature, 305:537-539 (1983)). Methods for making bispecific antibodies are within the purview of those skilled in the art. For example, bispecific antibodies can be produced by a variety of methods including fusion of hybridomas or linking of Fab' fragments. See, e.g., Songsivilai, et al, (1990) Clin. Exp. Immunol. 79:315-321, Kostelny, et al, (1992) J Immunol. 148:1547-1553. In addition, bispecific antibodies may be formed as "diabodies" (Holliger, et al, (1993) PNAS USA 90:6444-6448) or as "Janusins" (Traunecker, et al, (1991) EMBO J. 10:3655-3659 and Traunecker, et al, (1992) Int. J. Cancer Suppl. 7:51-52).

The antigen-binding site refers to the part of a molecule that binds to and is complementary to all or part of the target antigen. In an antibody molecule it is referred to as the antibody antigen-binding site and comprises the part of the antibody that specifically binds to and is complementary to all or part of the target antigen. Where an antigen is large, an antibody may only bind to a particular part of the antigen, which part is termed an epitope. An antibody antigen-binding site may be provided by one or more antibody variable domains. Preferably, an antibody antigen-binding site comprises an antibody light chain variable region (VL) and an antibody heavy chain variable region (VH).

Generally, the term "epitope" refers to the area or region of an antigen to which an antibody specifically binds, i.e. an area or region in physical contact with the antibody. Thus, the term "epitope" refers to that portion of a molecule capable of being recognized by and bound by an antibody at one or more of the antibody's antigen-binding regions. Typically, an epitope is defined in the context of a molecular interaction between an antibody, or antigen-binding portion thereof (Ab), and its corresponding antigen. Epitopes often consist of a surface grouping of molecules such as amino acids or sugar side chains and have specific three-dimensional structural characteristics as well as specific charge characteristics. In some embodiments, the epitope can be a protein epitope. Protein epitopes can be linear or conformational. In a linear epitope, all of the points of interaction between the protein and the interacting molecule (such as an antibody) occur linearly along the primary amino acid sequence of the protein. A "nonlinear epitope" or "conformational epitope" comprises non-contiguous polypeptides (or amino acids) within the antigenic protein to which an antibody specific to the epitope binds. The term "antigenic epitope" as used herein, is defined as a portion of an antigen to which an antibody can specifically bind as determined by any method well known in the art, for example, by conventional immunoassays.

An antibody that "specifically binds" to an epitope is a term well understood in the art, and methods to determine such specific binding are also well known in the art. A molecule is said to exhibit "specific binding" if it reacts or associates more frequently, more rapidly, with greater duration and/or with greater affinity with a particular cell or substance than it does with alternative cells or substances.

A variety of assay formats may be used to select an antibody or peptide that specifically binds a molecule of interest. For example, solid-phase ELISA immunoassay, immunoprecipitation, Biacore™ (GE Healthcare, Piscataway, NJ), KinExA, fluorescence-activated cell sorting (FACS), Octet™ (ForteBio, Inc., Menlo Park, CA) and Western blot analysis are among many assays that may be used to identify an antibody that specifically reacts with an antigen or a receptor, or ligand binding portion thereof, that specifically binds with a cognate ligand or binding partner. Typically, a specific or selective reaction will be at least twice the background signal or noise, more typically more than 10 times background, even more typically, more than 50 times background, more typically, more than 100 times background, yet more typically, more than 500 times background, even more typically, more than 1000 times background, and even more typically, more than 10,000 times background. Also, an antibody is said to "specifically bind" an antigen when the equilibrium dissociation constant (KD) is <7 nM).

Antibody Variant Molecules of the Invention

According to a first aspect of the invention there is provided an antibody variant molecule comprising (i) an Fc receptor binding site, (ii) an antigen-binding site and (iii) a spacer moiety located between (i) and (ii), wherein the spacer moiety increases the distance between (i) and (ii) so as to reduce the agonistic activity of the molecule as compared to the antibody variant that lacks (iii).

As noted above, the antibody can be from any animal. In a particular embodiment the antibody variant is a human antibody.

In certain embodiments the antibody variant is selected from the group consisting of a human antibody, a fully-human antibody, a humanized antibody, a chimeric antibody, and the like.

Antibody variant molecules of the invention may be IgG, e.g. IgG1, IgG2 (or aglycosyl IgG2), IgG3 or IgG4.

In certain embodiments the antibody variant is a monoclonal antibody.

An increase in length of the molecule simply refers to an increase in the number of amino acids in the antibody's polypeptide chain. An increase in the overall dimensions of the molecule refers to an increase in the size of the molecule in its fully-folded state, particularly the length of the antibody (from N- to C-terminus).

The agonistic property of an antibody that possesses or lacks the spacer moiety can be determined using assays well known in the art such as in vitro responses to T-cell activating agents as observed, for example, in the mixed lymphocyte reaction, or in vivo responses to immunogens, such as ovalbumin.

It will be appreciated that the precise location within the polypeptide primary structure sequence of the key domains of an antibody (e.g. CDRs, $C_H1$, $C_H2$, $C_H3$, hinge domain, Fc receptor binding site, etc.) will differ from antibody to antibody and particular class of antibody. Nevertheless, identifying the locations of these distinct parts of an antibody is routine to a person of skill in the art. To further facilitate this, we will also refer in this disclosure to a polypeptide sequence of a reference human IgG1 heavy chain polypeptide, which is set out as SEQ ID NO: 1 and is also referred to as "Reference Polypeptide". A reference murine IgG1 heavy chain polypeptide sequence ("Reference Murine Polypeptide") is also disclosed herein, SEQ ID NO: 2, which corresponds to the antibody disclosed as Clone 2 in EP2342228B1. Of course, it will be appreciated that the numbering of residues in these reference sequences and locations of key domains therein may not be the same as is in another antibody, however, these reference sequences can be used as a guide to map the locations of key antibody domains in another antibody heavy chain polypeptide.

With regard to the Reference Polypeptide disclosed in SEQ ID NO: 1, the key antibody domains are located at positions in SEQ ID NO: 1 as follows:
CDR1: Position 31-35, inclusive
CDR2: Position 50-66, inclusive
CDR3: Position 99-116, inclusive
$C_H1$: Position 128-225, inclusive
Hinge: Position 226-240, inclusive
$C_H2$: Position 241-350, inclusive
$C_H3$: Position 351-457, inclusive
Fc receptor binding regions*: Positions 241-249, inclusive; 274-280, inclusive; 304-309, inclusive; 335-342, inclusive.

Positions of CDRs were predicted, using the 'Kabat' setting, by ABodyBuilder tool provided by the SabPred server (Dunbar et al., SabPred structure-based antibody prediction serve. Nucleic Acids Res. 2016 Jul. 8; 44 (W1): W474-8).

* For determining the Fc receptor binding site, the following Protein Data Bank (PDB) files were used: 4λ4M (FcγRI complexed with hIgG1 Fc), 3RY6 (FcγRIIA complexed with hIgG1 Fc), 3WJJ (FcγRIIB complexed hIgG1 Fc with the point-mutation P238D), 3WJL (FcγRIIC complexed with V12-mutated hIgG1 Fc), 3SGJ (FcγRIIIA complexed with hIgG1 Fc), and 1T83 (FcγRIIIB complexed with hIgG1 Fc). The positions of the residues forming the individual Fc receptor binding sites were predicted using PISA (Krissinel and Henrick. J. Mol. Biol. 372:774-797, 2007).

SEQ ID NO: 2 is the reference murine IgG1 polypeptide sequence (Reference Murine Polypeptide) that corresponds to Clone 2 in EP2342228B1.

The Fc receptor binding site is the region of an antibody that is bound by a surface-associated Fc receptor and is typically located in $C_H2$ domain of the Fc region of the antibody, at a position adjacent to the C-terminal end of the hinge. By way of example, in the Reference Polypeptide (SEQ ID NO: 1) the Fc receptor binding site/region(s) comprises residues from position 241 to 342, inclusive.

The antibody variant molecules of the invention may be in isolated/purified form. An isolated/purified antibody variant of the invention will be free or substantially free of material with which they are naturally associated, such as other proteins or nucleic acids with which they are found in their natural environment, or the environment in which they are prepared (e.g. cell culture) when such preparation is by recombinant DNA technology practised in vitro or in vivo.

In particular embodiments, an antibody variant of the invention is greater than 80%, such as greater than 90%, greater than 95%, greater than 97% and greater than 99% pure.

Spacer Moiety or De-Agonist Moiety

The spacer moiety or de-agonist moiety can be any structure that can be introduced into the antibody that increases the overall dimensions of the antibody, that is by increasing the distance between the antigen-binding and Fc receptor binding regions, measurable as an increase in the Stoke's radius of the antibody (the largest dimensional increase) by, for example >40 Å (see Erickson, Size and Shape of Protein Molecules at the Nanometer Level Determined by Sedimentation, Gel Filtration, and Electron Microscopy. Biol Proced Online. 11:32-51, 2009). Suitably this is by inclusion of a polypeptide sequence, In certain embodiments, the spacer moiety can adopt a rigid spatial conformation in solution or a conformation with limited flexibility. In a particular embodiment, the spacer moiety is a polypeptide sequence (polypeptide spacer), such as one that adopts a rigid conformation.

Suitably, the polypeptide sequence is comprised of natural amino acids, however non-natural amino acids may also be employed, or the spacer moiety can be a peptidomimetic moiety. To date, in excess of 100 different non-natural amino acids have been put into proteins and over 30 unnatural amino acids have been co-translationally incorporated into proteins (see Xie et al., Curr Opin Chem Biol. 9:548-554, 2005; and Lu and Freedland Genome Biology. 7 (1): 102, 2006).

Suitable illustrative polypeptide sequences comprise a mucin or mucin-like sequence that contain a high proportion of the amino acids serine and threonine and are modified with a high density of O-linked oligosaccharides. In a particular embodiment, the polypeptide spacer sequence is one that is not found naturally in immunoglobulins.

The spacer moiety can be anything which can increase the overall dimensions of the antibody. In a particular embodiment, the spacer moiety is a polypeptide (polypeptide spacer). Suitably, the polypeptide spacer is at least 20 amino acids in length, such as at least 25, at least 30, at least 35, at least 40, at least 45, at least 50, at least 55, at least 60, at least 65, at least 70, at least 75, at least 80, at least 90, or at least 100 amino acids in length. In some embodiments, the polypeptide spacer comprises from about 10-100 amino acids, 10-90 amino acids, 10-80 amino acids, 10-70 amino acids, 10-60 amino acids, 10-50 amino acids, 10-40 amino acids, 10-30 amino acids 20-100 amino acids, 20-90 amino acids, 20-80 amino acids, 20-70 amino acids, 20-60 amino acids, 20-50 amino acids, 20-40 amino acids, or 20-30 amino acids. An increase of 100 amino acids (residues) equates to approximately twice the persistence length of a mucin-like segment of protein.

De-agonized" as used herein, is a term meaning with less agonist activity compared to the molecule which is not modified according to the present invention (by insertion of the spacer moiety).

In a particular embodiment, the spacer moiety is a rigid spacer. A rigid spacer is a spacer that has reduced or minimal flexibility such that it adopts a rigid conformation. In certain embodiments, the spacer moiety is designed to have limited flexibility in order to accommodate a tailored reduction in agonism.

By "rigid conformation" we mean one that adopts a stiff and extended conformation, i.e. lacks significant flexibility. By way of example, the rigid conformation would be similar to that adopted by a mucin-like segment of protein.

Mucins contain a large central region formed of multiple tandem repeats of 10 to 80 residue sequences in which up to half of the amino acids are serine or threonine, which are saturated with O-linked oligosaccharides (Perez-Vilar and Hill, The Structure and Assembly of Secreted Mucins. J Biol Chem 274, 31751-31754, 1999). The highly glycosylated domains of mucins are long extended structures that are much less flexible than unglycosylated random coils and are devoid of secondary structures (Jentoft, Trends Biochem. Sci. 15:291-294, 1991). The oligosaccharides contribute to this stiffness by limiting the rotation around peptide bonds and by charge repulsion among the neighbouring, negatively charged oligosaccharide groups. These tandem repeats, which adopt a rigid structure are thus suitable for use in the present invention.

In particular embodiments, the polypeptide spacer is a mucin or mucin-like polypeptide.

In particular embodiments, at least 25%, such as at least 30% or at least 40%, of the amino acids in the polypeptide spacer are serine and threonine residues. The presence of such amounts of serine and threonine residues results in the rigid conformation, especially when certain numbers of these are saturated with O-linked oligosaccharides. In some instances, interspersed proline residues may also contribute to the rigidity of the structure.

As used herein, a mucin polypeptide sequence is one that comprises a repeat sequence found in mucin protein with a high proportion of serine and threonine residues that are capable of being saturated with O-linked oligosaccharides and may contain interspersed proline residues (such as in SEQ ID Nos: 3, 4, 5 or 6).

Examples of mucin repeat sequences that could be used are given in Table L of the Supplementary Information of: Perez-Vilar and Hill, The Structure and Assembly of Secreted Mucins. J Biol Chem 274, 31751-31754, 1999. An example of a mucin-like protein is CD43, which is a membrane anchored protein with an extracellular region comprising a high proportion of serine and threonine residues that are saturated with O-linked oligosaccharides, and interspersed proline residues The amino acid sequences of mucins from numerous species (e.g. human, mouse, dog, rat, frog, etc), including the tandem repeat domains are known. Sequences from these repeat domains can be used in the present invention as all or part of the spacer moiety so as to extend the length of the antibody.

Suitable sequences from mouse CD43, include the 50 amino acid sequence disclosed in SEQ ID NO: 3 (RTTMLPSTPHITAPSTSEAQNASPSVSVGSGTVDSKETISPWGQTTIPVS) or the 30 amino acid sequence disclosed in SEQ ID NO: 4 (RTTMLPSTPHITAPSTSEAQNASPSVSVGS).

For human antibodies, in order to reduce immunogenicity, the equivalent sequence of human CD43 could be used. Accordingly, a suitable sequence from human CD43, includes the sequence in SEQ ID NO: 5 (STTAVQTPTSGEPLVSTSEPLSSKMYTTSITSDPKADSTGDQTSALPPST) or SEQ ID NO: 6 (STTAVQTPTSGEPLVSTSEPLSS).

A mucin-like polypeptide is one that differs from the wild-type mucin repeat sequence but comprises significant identity thereto (e.g. at least 70%, such as at least 75%, at least 80%, at least 85%, at least 90% and at least 95% identity thereto) or it is a sequence wherein at least 25%, such as at least 30%, or at least 35%, or at least 40%, or at least 45% of the amino acids in the polypeptide are serine and threonine residues. In a particular embodiment, certain of these serine and/or threonine residues are capable of being saturated with O-linked oligosaccharides.

In particular embodiments, the polypeptide spacer comprises the amino acid sequence disclosed as SEQ ID NO: 3, 4, 5 or 6.

The Fc receptor binding site and the antigen-binding (or combining) region of the antibody are the anchor points for the antibody that establish the gap between the two apposing cells and determine if the complex is excluded or not. As such it is an increase in length in this region (by virtue of the presence of a spacer moiety) and/or the effect this spacer has on the overall distance between these two binding sites that determines whether the complex is excluded or not.

The inventors have appreciated that by increasing the length or overall dimensions of the antibody the antibody variant/receptor complex can be excluded from close contact (see FIG. 1). Thus, in particular embodiments, the spacer moiety is one that increases the length and/or overall dimensions of the antibody by at least 40 Å, such as at least 50 Å, at least 60 Å, at least 70 Å, at least 75 Å, at least 100 Å, at least 125 Å, at least 150 Å, at least 175 Å or at least 200 Å. In a particular embodiment, the increase in overall dimensions means the increase in spacing between at least one antigen-binding site and the Fc receptor binding site.

In particular embodiments, the presence of the spacer moiety increases the overall dimensions of or spacing between the antigen-binding site and the Fc receptor binding site in the antibody variant by at least 50 Å, such as at least 75 Å, at least 100 Å, at least 125 Å, at least 150 Å, at least 175 Å, at least 200 Å, or at least 250 Å compared to the antibody lacking the spacer moiety.

An increase in size of 50 Å has been shown to be enough of a size difference to effect receptor reorganization at a contact (Schmid et al., Size-dependent protein segregation at membrane interfaces. Nat Phys. 2016 July; 12 (7): 704-711. Epub 2016 Mar. 7).

In a particular embodiment, the polypeptide spacer has a long persistence length, such as at least 4, 5, 6, 7, 8, 9, 10, 11, 12, 15 or 20 nm in length. By increasing the length of the antibody by, for example 4 or more nm, the variant antibody is capable of causing spontaneous reorganisation of receptors at the interfaces (see FIG. 1).

A mucin-like protein has a persistence length of 125 Å, i.e. about 50 residues increases (see, e.g., Jentoft, Why are proteins O-glycosylated? Trends Biochem Sci 15:291-294, 1990).

The persistence length is a basic mechanical property that quantifies the stiffness of a polymer. Informally, it provides a measure of the distance along which a polymer's direction persists before changing course (Trachtenberg and Hammel. Determining the persistence length of biopolymers and rod-like macromolecular assemblies from electron microscope images and deriving some of their mechanical properties. In Microscopy: Science, Technology, Applications and Education A. Méndez-Vilas and J. Díaz, Eds. 2010).

Location of Spacer Moiety

The spacer moiety can be positioned anywhere in the antibody that does not interfere with the ability of the antibody to bind to its antigen. Thus, ideally the spacer moiety is not located within the antigen combining regions (complementary-determining regions (CDRs)) at the top of the Fab.

In certain embodiments the spacer moiety is introduced between the antigen-binding site and the Fc receptor binding site of the antibody.

The IgG Fc region contains distinct Fc receptor binding sites (e.g. see Wines et al., The IgG Fc contains distinct Fc receptor (FcR) binding sites: the leukocyte receptors Fc gamma RI and Fc gamma RIIa bind to a region in the Fc distinct from that recognized by neonatal FcR and protein A. J Immunol. 164, 5313-8, 2000).

With reference to the exemplary antibody heavy chain polypeptide (Reference Polypeptide) sequence disclosed in SEQ ID NO: 1, the spacer moiety can be positioned at a site within the region bounded by positions 128 (the beginning of the $C_H1$ domain marking the base of the antigen combining region) and 240, inclusive.

If using the murine IgG1 heavy chain reference sequence (SEQ ID NO: 2), to map the location of the spacer moiety insertion site, the spacer moiety can be positioned at a site between positions residue 121 (the beginning of the $C_H1$ domain marking the base of the antigen combining region) and 262, a residue forming part of the Fc receptor binding region of mouse IgG (Baudino et al., Crucial role of aspartic acid at position 265 in the $C_H2$ domain for murine IgG2a and IgG2b Fc-associated effector functions. J. Immunol. 181, 6664-6669, 2008), inclusive. As explained above, it will be appreciated that the exemplar sequences are included merely to guide the positioning of the spacer moiety and that the precise amino acid locations in distinct antibodies will differ.

In certain embodiments, the spacer moiety is introduced between the Fab regions and the FcR binding region of the antibody.

In certain embodiments, the spacer moiety is introduced into the hinge domain. With respect to the Reference Polypeptide (SEQ ID NO: 1) this would be from position 226 to 240, inclusive.

In certain embodiments, the spacer moiety is introduced into the CHI domain. With respect to the Reference Polypeptide this would be from position 128 to 225, inclusive.

In certain embodiments, the spacer moiety is introduced at a site between the start of the first constant domain (also known as $C_H1$) and the FcR binding region of the antibody. With respect to the Reference Polypeptide this would be from position 128 to 240, inclusive.

Thus, in a particular embodiment, the spacer moiety is located at a site within the region bounded by positions 128 and 240, inclusive, in the Reference Polypeptide as disclosed in SEQ ID NO: 1.

In certain embodiments, the spacer moiety is introduced at a site between the start of the first constant domain (also known as $C_H1$) and the end of the hinge domain. With respect to the Reference Polypeptide this would be from position 128 to 240, inclusive.

In a particular embodiment, the spacer moiety is located within the Fab region. To effect this, a spacer moiety can be introduced into the constant regions of both the light and heavy (e.g. $C_H1/C_\kappa1$ or $C_\lambda1$ region) polypeptides of the antibody, such as into the nucleic acids encoding these polypeptide chains.

In a particular embodiment, the spacer moiety is only introduced into heavy chain constant region(s), such as in the hinge region. It will be appreciated that by introducing the spacer moiety into the heavy chain only, the companion light chain that creates the antigen-binding site when coupled with the heavy chain need not be modified (by inclusion of a spacer moiety). Accordingly, the "modification" that creates the antibody variant of the invention need only be engineered into the heavy chain, such as into the heavy chain encoding nucleic acid. In this way, the spacer moiety need only be expressible from the nucleic acid encoding the heavy chain polypeptide strand.

Thus, if the spacer moiety is a polypeptide introduced into the heavy chain of the antibody only, then an antibody variant can be produced wherein, relative to the parent antibody molecule, only the heavy chain antibody polypeptide has been adapted by inclusion of a polypeptide spacer. The light chain polypeptide need not be adapted.

In certain embodiments, the spacer moiety is located in and serves to extend the constant region.

In certain embodiments, the spacer moiety is located at a site in the hinge region of the antibody. With reference to the Reference Polypeptide sequence disclosed in SEQ ID NO: 1, the hinge region is located from amino acid position 226 to 240, inclusive. Thus, in a particular embodiment, the spacer moiety is located at a site within the region bounded by positions 226 and 240, inclusive, in the Reference Polypeptide as disclosed in SEQ ID NO: 1.

The methods required to introduce the spacer moiety into a parent antibody molecule using recombinant/molecular biology techniques are routine and well known to a person of skill in the art.

In certain embodiments the polypeptide spacer moiety is introduced into the antibody polypeptide chain using a linker sequence at one or both ends of the spacer. Any suitable linker sequence could be used. The linker sequence is typically a short peptide. Thus, the spacer polypeptide may comprise linker/spacer-polypeptide/linker. Suitably the linker sequence is glycine-serine (GS) or glycine-glycine (GG). Thus, the spacer polypeptide may comprise a linker at each end, such as GS or GG. Suitable examples include GS/spacer-polypeptide/GS, GG/spacer-polypeptide/GG, GS/spacer-polypeptide/GG and GG/spacer-polypeptide/GS.

The presence of the spacer moiety reduces the agonistic activity of the antibody as compared to a corresponding antibody that lacks the spacer moiety. In particular embodiments, the introduction of the spacer moiety reduces the agonistic activity by at least 25%, such as at least 50%, at least 60%, at least 75%, at least 85% or at least 90%, as compared to the antibody/antibody variant that lacks the spacer moiety.

In a particular embodiment, the introduction of (or presence of) the spacer moiety substantially eliminates (>95%) the agonistic activity as compared to the antibody/antibody variant that lacks the spacer moiety.

The agonistic activity of the molecule(s) can be assessed in vivo using conventional assays such as a T-cell transfer assay. In this assay, T cells, comprising a mixture of humanized and wild-type cells are transferred into a host, following which the mice are immunized and then dosed with agonistic anti-human receptor antibody. Sometime afterward, the expansion of the two populations of cells relative to one another is measured. The contraction of the population of humanized cells, which bind the anti-human receptor antibody, relative to the wild-type controls, is reflective of the agonistic potential of the antibody.

In particular embodiments, when an antibody variant molecule of the invention is bound to its antigen, the complex of the antibody and the receptor is sterically excluded from the close contact (e.g. the contact between target cell and T cell-see FIG. 1).

By sterically excluded from the close contact, we mean that the complex of the antibody and the receptor cannot be accommodated in the shallow gap between the cells, and the complex is therefore driven out of the contact.

Nucleic Acid Molecules

The antibody variant/construct of the invention will be encoded by nucleic acid. The antibody variant/construct may be encoded by a single nucleic acid molecule or it may be encoded by two or more nucleic acid molecules. For example, as the antigen-binding site is typically formed by the coming together of a heavy chain variable polypeptide region and a light chain variable polypeptide region, the two variable (heavy and light) polypeptide regions may be encoded by separate nucleic acid molecules. Alternatively, in other circumstances, they may be encoded by the same nucleic acid molecule.

According to a second aspect of the invention there is provided one or more nucleic acid molecules that encode an antibody variant in accordance with any of the first to fourth aspects of the invention.

As noted above, the polypeptide spacer can be located within the heavy chain polypeptide only. Thus, according to a variation of this aspect there is provided a nucleic acid that encodes the heavy chain polypeptide of an antibody variant in accordance with the first aspect of the invention. In particular, the heavy chain polypeptide has been engineered to include a polypeptide spacer as described herein.

One of the nucleic acid molecules may encode just the VL polypeptide sequence of the antibody variant. One of the nucleic acid molecules may encode just the VH polypeptide sequence of the antibody variant. However, the nucleic acid molecule may also encode both VH and VL antibody variant sequences.

The nucleic acid molecule(s) that encode the antibody variant of the invention, such as according to the first aspect of the invention, may be, or may be part of, a plasmid vector, such as an expression vector that may comprise other functional regions (elements) such as one or more promoters, one or more origins or replication, one or more selectable marker(s), and one or more other elements typically found in expression vectors. The cloning and expression of nucleic acids that encode proteins, including antibodies, is well established and well within the skill of the person in the art.

According to a third aspect of the invention there is provided a vector comprising the nucleic acid of the second aspect of the invention. In particular embodiments, the vector is a plasmid vector, cosmid vector, viral vector, or an artificial chromosome.

The nucleic acids of the invention, including vector nucleic acids that comprise nucleotide sequences that encode the polypeptides capable of forming an antibody variant of the invention may be in purified/isolated form.

Isolated nucleic acids that encode an antibody variant of the invention will be free or substantially free of material with which they are naturally associated, such as other proteins or nucleic acids with which they are found in their natural environment, or the environment in which they are prepared (e.g. cell culture) when such preparation is by recombinant DNA technology practised in vitro or in vivo.

In particular embodiments, the nucleic acids of the invention are greater than 80%, such as greater than 90%, greater than 95%, greater than 97% and greater than 99% pure.

Thus, according to another variation of the third aspect of the invention there is provided a vector comprising a nucleic acid or nucleotide sequence that encodes a heavy chain variable polypeptide or a light chain variable polypeptide of the antibody variant of the invention. In a particular embodiment, the vector comprises nucleic acid that encodes both the heavy and light chain variable regions. In particular embodiments, the said polypeptides may also comprise other domains such as constant domains, hinge regions, and an Fc region, such as one comprising one or more Fc receptor binding sites.

The nucleic acid and/or vector of the invention may be introduced into a host cell. The introduction may employ any available technique. For eukaryotic cells, suitable techniques may include calcium phosphate transfection, DEAE-Dextran, electroporation, liposome-mediated transfection and transduction using retrovirus or other virus, e.g. vaccinia or, for insect cells, baculovirus. Introducing nucleic acid in the host cell, in particular a eukaryotic cell may use a viral or a plasmid-based system. The plasmid system may be maintained episomally or may be incorporated into the host cell or into an artificial chromosome. Incorporation may be either by random or targeted integration of one or more copies at single or multiple loci. For bacterial cells, suitable techniques may include calcium chloride transformation, electroporation and transfection using bacteriophage.

In one embodiment, the nucleic acid of the invention is integrated into the genome (e.g. chromosome) of the host cell. Integration may be promoted by inclusion of sequences that promote recombination with the genome, in accordance with standard techniques.

Host Cells

A further aspect of the present invention provides a host cell containing nucleic acid as disclosed herein. Such a host cell may be in vitro and may be in culture.

A fourth aspect of the present invention provides a host cell containing nucleic acid as disclosed herein. Such a host cell may be in vitro and may be in culture.

The host cell can be from any species, such as a bacteria or yeast but suitably the host cell is an animal cell such as a human cell, such as human embryonic kidney cells, or a non-human mammalian cell, such as a Chinese hamster ovary cell.

The introduction of the nucleic acid may be followed by causing or allowing expression from the nucleic acid, e.g. by culturing host cells under conditions for expression of the gene. The purification of the expressed product may be achieved by methods known to one of skill in the art.

Thus, the nucleic acids of the invention, including vector nucleic acids that comprise nucleotide sequences that encode the polypeptides capable of forming the antibodies variant of the invention may be present in an isolated host cell. The host cell is typically part of a clonal population of host cells. As used herein, reference to a host cell also encompasses a clonal population of said cell. A clonal population is one that has been grown from a single parent host cell. The host cell can be from any suitable organism. Suitable host cells include bacterial, fungal or mammalian cells.

The host cell may serve to assist in amplifying the vector nucleic acid (such as with a plasmid) or it may serve as the biological factory to express the polypeptide(s) of the invention that form the antibody variant of the invention. A suitable host for amplifying the vector nucleic acid could be a bacterial or fungal cell, such as an *Escherichia coli* cell or *Saccharomyces cerevisiae* cell. A suitable host for expressing the proteins of the invention (i.e. the polypeptides making up the antibody variant of the invention would be a mammalian cell such as a human embryonic kidney (HEK) 293 or Chinese hamster ovary (CHO) K1 cell. In a particular embodiment, the host cell is a mammalian cell, such as a HEK 293 or CHO-K1 cell.

A variety of host-expression vector systems may be utilized to express an antibody variant molecule as described herein (see e.g. U.S. Pat. No. 5,807,715). For example, mammalian cells such as CHO, in conjunction with a vector such as the major intermediate-early gene promoter element from human cytomegalovirus is an effective expression system for CEA proteins (Foecking et al., Gene, 45:101, 1986; and Cockett et al., Bio/Technology, 8:2, 1990). Different host cells have characteristic and specific mechanisms for the post-translational processing and modification of proteins and gene products. Appropriate cell lines or host systems can be chosen to ensure the correct modification and processing of the protein of the disclosure. To this end, eukaryotic host cells which possess the cellular machinery for proper processing of the primary transcript, glycosylation, and phosphorylation of the gene product may be used. Such mammalian host cells include but are not limited to CHO, HEK 293, VERY, BHK, Hela, COS-7, MDCK, 3T3, W138, BT483, Hs578T, HTB2, BT20 and T47D, NS0, CRL7030 and HsS78Bst cells.

Antibody Variant Production

According to a fifth aspect of the invention there is provided a method of producing an antibody variant in accordance with the first aspect of the invention, the method comprising expressing the one or more nucleic acids in accordance with the second aspect of the invention in a host cell.

The antibody variant of the invention may be made using methods known in the art, for example, by a process comprising culturing a host cell containing nucleic acid encoding an antibody variant in a form suitable for expression, under conditions suitable to produce such antibody variant and recovering the antibody variant.

In one embodiment, the method of production of an antibody variant includes causing expression from encoding nucleic acids. Such a method may comprise culturing host cells under conditions for production of said antibody variant.

According to a variation of the fifth aspect of the invention there is provided a method of producing an antibody variant of the invention, comprising the step of culturing the host cell that comprises nucleic acid encoding the polypeptide(s) that form the antibody variant of the invention under conditions for production of said antibody variant, optionally further comprising isolating/purifying said antibody variant of the invention.

Synthetic antibody molecules may be created by expression from genes generated by means of oligonucleotides synthesized and assembled within suitable expression vectors, for example, as described by Knappik et al. (J Mol Biol 296, 57-86, 2000) or Krebs et al. (J Immunol Methods 254, 67-84, 2001).

Conditions for the production of the antibody variant of the invention and purification of said molecules are well-known in the art. One way of attending to this is to prepare a clonal population of cells capable of expressing the antibody variant of the invention and culturing these in a suitable growth medium for a period of time and at a temperature conducive to allow for expansion/growth of the cell population and expression of the protein(s) of interest. If the protein(s) of interest (e.g. antibody variant of the invention) are secreted into the growth medium, then the medium is subjected to purification processes. Antibody purification typically involves isolation of antibody from, for example the medium or from the culture supernatant of a hybridoma cell line using well-established methods typically involving chromatography (e.g. using affinity chromatography, anionic and/or cationic exchange chromatography or other separation techniques) to separate the protein of interest from unwanted host- or tissue culture medium-derived proteins and other cellular contaminants (e.g. nucleic acids, carbohydrates etc.). The purified proteins may also be subjected to a virus inactivation step. Finally, the purified protein of interest may, for example, be lyophilized or formulated ready for storage, shipment and subsequent use. Preferably the protein of interest (e.g. antibody or antigen-binding fragment thereof of the invention) will be substantially free from contaminating proteins which were originally present in the culture medium following expression.

A method of production may comprise a step of isolation/purification of the antibody variant/construct (the product). A method of production may comprise formulating the product into a pharmaceutical composition including at least one additional component, such as a pharmaceutically acceptable excipient.

In particular embodiments the antibody variant protein (product) of the invention is greater than 80%, such as greater than 90%, greater than 95%, greater than 97% and greater than 99% pure.

According to a sixth aspect of the invention there is provided a method for preparing an antibody variant in accordance with the first aspect of the invention, comprising identifying the nucleic acid sequences encoding an antibody of interest and modifying said nucleic acid sequences to encode a variant of the antibody of interest which variant comprises a polypeptide spacer moiety introduced so as to encode an antibody variant according to the first aspect of the invention.

In a particular embodiment, the method for preparing an antibody variant molecule comprises (i) identifying the nucleic acid sequence or sequences encoding an antibody of interest; (ii) modifying said nucleic acid sequence(s) to encode a variant of the antibody of interest which variant comprises a polypeptide spacer moiety introduced so as to encode an antibody variant according to the first aspect of the invention; (iii) introducing said modified nucleic acid from step (ii) into a host cell; and (iv) expressing said antibody variant molecule.

According to a seventh aspect of the invention there is provided a method for reducing the agonistic activity of an antibody, comprising introducing a spacer moiety into the antibody molecule that increases the distance between the Fc receptor binding site and the antigen-binding site of the molecule. In a particular embodiment the spacer moiety is a polypeptide. In a particular embodiment the spacer moiety is inserted in the antibody hinge region. In a particular embodiment the spacer moiety is a rigid spacer moiety.

In particular embodiments of either of the sixth or seventh aspects of the invention, the antibody or antibody of interest for reduction of agonism by inclusion of a spacer moiety is selected from the group consisting of: nivolumab, pembrolizumab or cemiplimab, MEDI0680, dostarlimab, pidilizumab, AMP-224, camrelizumab, tislelizumab, genolimzumab, JS001-PD-1, ipilimumab, tremelimimab, tiragolumab, etigilimab, BMS-986207, Ab154, cobolimab, BMS-986258, MBG453, LY3321367, Sym023, muromab, otelixizumab, teplizumab, visilizumab and foralumab.

Pharmaceutical Compositions

While an antibody construct molecule described herein may be administered alone, in certain embodiments administration is of a pharmaceutical composition wherein the antibody variant molecule is formulated with at least one pharmaceutically-acceptable excipient.

According to an eighth aspect of the invention there is provided a pharmaceutical composition comprising an antibody variant/construct according to the first aspect of the invention or an antibody variant produced in accordance with any of the third to fifth aspects of the invention and at least one pharmaceutically-acceptable excipient.

A "pharmaceutical composition" refers to a preparation which is in such form as to permit the biological activity of the active ingredient to be effective, and which contains no additional components which are unacceptably toxic to a subject to which the formulation would be administered. The pharmaceutical composition will include one or more pharmaceutically acceptable excipients. The term excipient in this context refers to any additive, such as fillers, solubilizers, carriers, vehicles, additives and the like.

"Pharmaceutically acceptable" excipients are those which can reasonably be administered to a subject mammal to provide an effective dose of the active ingredient employed. Pharmaceutical compositions of the invention are prepared for storage by mixing the composition with optional pharmaceutically acceptable carriers, excipients or stabilizers (Remington's Pharmaceutical Sciences 16th edition, Osol, A. Ed. (1980)), in the form of lyophilized formulations or aqueous solutions. Acceptable excipients are nontoxic to recipients at the dosages and concentrations employed, and include buffers such as phosphate, citrate, and other organic acids; antioxidants including ascorbic acid and methionine; preservatives (such as octadecyldimethylbenzyl ammonium chloride; hexamethonium chloride; benzalkonium chloride, benzethonium chloride; phenol, butyl or benzyl alcohol; alkyl parabens such as methyl or propyl paraben; catechol; resorcinol; cyclohexanol; 3-pentanol; and m-cresol); low molecular weight (less than about 10 residues) polypeptides; proteins, such as serum albumin, gelatin, or immunoglobulins; hydrophilic polymers such as polyvinylpyrrolidone; amino acids such as glycine, glutamine, asparagine, histidine, arginine, or lysine; monosaccharides, disaccharides, and other carbohydrates including glucose, mannose, or dextrins; chelating agents such as EDTA; sugars such as sucrose, mannitol, trehalose or sorbitol; salt-forming counter-ions such as sodium; metal complexes (e.g. Zn-protein complexes); and/or non-ionic surfactants such as TWEEN™, PLURONICS™ or polyethylene glycol (PEG). Lyophilized HER2 antibody formulations are described in WO 97/04801.

The compositions to be used for in vivo administration must be sterile. This can be readily accomplished by filtration through sterile filtration membranes.

The route of administration of the antibody variant molecule or the pharmaceutical composition comprising it can be, for example, oral, parenteral, by inhalation or topical. The term parenteral as used herein includes, e.g. intravenous, intraarterial, intraperitoneal, intramuscular, subcutaneous, rectal, or vaginal administration.

Pharmaceutical compositions for oral administration may be in tablet, capsule, powder, liquid or semi-solid form. A tablet may comprise a solid carrier such as gelatin or an adjuvant. Liquid pharmaceutical compositions generally comprise a liquid carrier such as water, petroleum, animal or vegetable oils, mineral oil or synthetic oil. Physiological saline solution, dextrose or other saccharide solution or glycols such as ethylene glycol, propylene glycol or polyethylene glycol may be included, as required.

Pharmaceutical compositions for parenteral administration include sterile aqueous or non-aqueous solutions, and suspensions. Examples of non-aqueous solvents are propylene glycol, polyethylene glycol, and injectable organic esters such as ethyl oleate. Aqueous carriers include water, aqueous solutions, or suspensions, including saline and buffered media. Parenteral vehicles include sodium chloride solution, Ringer's dextrose, dextrose and sodium chloride, lactated Ringer's, or fixed oils. Intravenous vehicles include fluid and nutrient replenishes, electrolyte replenishers (such as those based on Ringer's dextrose), and the like.

Preservatives and other additives may also be present such as, for example, antimicrobials, antioxidants, chelating agents, and inert gases and the like. In addition, the composition might comprise proteinaceous carriers, like, e.g., serum albumin or immunoglobulin, in certain embodiments of human origin. For intravenous injection, or injection at the site of affliction, the active ingredient will be in the form of a parenterally acceptable aqueous solution which is pyrogen-free and has suitable pH, isotonicity and stability. Those of relevant skill in the art are well able to prepare suitable solutions using, for example, isotonic vehicles such as sodium chloride injection, Ringer's Injection, lactated Ringer's injection. Preservatives, stabilizers, buffers, antioxidants and/or other additives may be included, as required. As noted above, these are all referred to herein as excipients.

Compositions for injection can be administered with medical devices known in the art, for example, with a hypodermic needle. Needleless injection devices, such as those disclosed in U.S. Pat. Nos. 6,620,135 and 5,312,335 could also be utilized.

A pharmaceutical composition of the invention may be administered alone or in combination with other treatments, either simultaneously or sequentially dependent upon the condition to be treated.

An antibody variant of the present invention may be formulated in liquid, semi-solid or solid forms depending on the physicochemical properties of the molecule and the route of delivery. Formulations may include excipients, or combinations of excipients, for example: sugars, amino acids and surfactants. Liquid formulations may include a wide range of antibody concentrations and pH. Solid formulations may be produced by lyophilization, spray drying, or drying by supercritical fluid technology, for example.

The pharmaceutical composition can be administered as a single dose, multiple doses or over an established period of time in an infusion. Dosage regimens also can be adjusted to provide the optimum desired response (e.g. a therapeutic or prophylactic response). In particular, parenteral formulations can be a single bolus dose, an infusion or a loading bolus dose followed with one or more maintenance doses. These compositions can be administered at specific fixed or variable intervals, e.g., once a day, or on an "as needed" basis.

Dosages

The amount of the antibody variant molecule, or the pharmaceutical formulation containing such molecule, which will be therapeutically effective can be determined by standard clinical techniques, such as through dose ranging clinical trials. In addition, in vitro assays may optionally be employed to help identify optimal dosage ranges. The precise dose to be employed in the formulation will also depend on the route of administration, and the seriousness of the disease or disorder, and should be decided according to the judgment of the practitioner and each patient's circumstances. Effective doses may be extrapolated from dose-response curves derived from in vitro or animal model test systems. The dosage of the compositions to be administered can be determined by the skilled artisan without undue experimentation in conjunction with standard dose-response studies. Relevant circumstances to be considered in making those determinations include the condition or conditions to be treated, the choice of composition to be administered, the age, weight, and response of the individual patient, and the severity of the patient's symptoms. For example, the actual patient body weight may be used to calculate the dose of the formulations in milliliters (mL) to be administered. There may be no downward adjustment to "ideal" weight. In such a situation, an appropriate dose may be calculated by the following formula:

Dose(mL)=[patient weight(kg)×dose level(mg/kg)/drug concentration(mg/mL)]

Therapeutically effective doses of the pharmaceutical compositions for the treatment of a particular disease or disorder will vary depending upon many different factors, including means of administration, target site, physiological state of the patient, weight of the patient, sex of the patient, age of the patient, whether the patient is human or an animal, other medications administered, and whether treatment is prophylactic or therapeutic. The therapeutically effective dose is likely to have been determined from clinical trials and is something that the attending physician can determine using treatment guidelines. Usually, the patient is a human, but non-human mammals can also be treated. Treatment dosages can be titrated using routine methods known to those of skill in the art to optimize safety and efficacy.

In various embodiments, the antibody-variant molecule is administered at a concentration of about 1 mg/kg, about 2 mg/kg, about 3 mg/kg, about 4 mg/kg, about 5 mg/kg, about 6 mg/kg, about 7 mg/kg, about 8 mg/kg, about 9 mg/kg, about 10 mg/kg, about 11 mg/kg, about 12 mg/kg, about 13 mg/kg, about 14 mg/kg, about 15 mg/kg, about 16 mg/kg, about 17 mg/kg, about 18 mg/kg, about 19 mg/kg, or about 20 mg/kg.

Therapy/Medical Uses

An antibody variant of the invention or a pharmaceutical composition comprising said antibody variant of the invention may be used in therapy, typically as a medicament.

According to a ninth aspect of the invention there is provided an antibody variant/construct in accordance with the first aspect of the invention or the pharmaceutical composition in accordance with the eighth aspect of the invention for use in therapy.

It will be appreciated that the present invention is generally applicable to any antibody and as such the antibody variants of the invention or pharmaceutically acceptable formulations comprising these can be used in the treatment of any disease where antibody therapy is possible or desirable.

In a particular embodiment, the therapy is treatment of cancer.

In a particular embodiment, the antibody variant binds to a checkpoint inhibitor and is useful in the treatment of cancer.

According to a ninth aspect of the invention there is provided a method of treating a patient in need thereof, comprising administering to the patient an antibody variant in accordance with the first aspect of the invention or the pharmaceutical composition in accordance with the eighth aspect of the invention. In a particular embodiment, the method is for treating cancer. In another embodiment, the method of treating cancer comprises administering to a patient in need thereof an antibody variant molecule that has been adapted to minimize/lack agonistic activity by extension of the molecule to maximize its exclusion from the close contact, or a pharmaceutical composition thereof. In a particular embodiment, the extension is caused by inclusion of a rigid spacer moiety into the antibody. In a particular embodiment, the antibody variant in accordance with the first aspect of the invention or the pharmaceutical composition in accordance with the eighth aspect of the invention is administered to a patient in need thereof in a pharmaceutically acceptable amount.

In a variation of this ninth aspect there is provided an antibody variant in accordance with the first aspect of the invention or the pharmaceutical composition in accordance with the eighth aspect of the invention for use in a method of treating a patient in need thereof. In a particular embodiment, the method is for treating cancer.

In a further variation of this ninth aspect there is provided use of an antibody variant in accordance with the first aspect of the invention or the pharmaceutical composition in accordance with the eighth aspect of the invention in the manufacture of a medicament for the treatment of a patient in need thereof. In a particular embodiment, the patient has cancer and the medicament is to treat said cancer.

The term "effective amount" refers to a dosage or an amount of a drug that is sufficient to ameliorate the symptoms in a patient or to achieve a desired biological outcome, e.g. increased cytolytic activity of T cells, increased death of tumour cells, reduced tumour size, etc. Where the disease is cancer, the effective amount of the drug may reduce the number of cancer cells; reduce the tumour size; inhibit (i.e. slow to some extent and preferably stop) cancer cell infiltration into peripheral organs; inhibit (i.e. slow to some extent and preferably stop) tumour metastasis; inhibit, to some extent, tumour growth; and/or relieve to some extent one or more of the symptoms associated with the cancer. To the extent the drug may prevent tumour growth and/or kill existing cancer cells, it may be cytostatic and/or cytotoxic. The effective amount may extend progression free survival, result in an objective response (including a partial response, PR, or complete response, CR), increase overall survival time, and/or improve one or more symptoms of cancer.

Fc Receptor (FcR) Binding Site

In certain embodiments, the antibody variant has a functional Fc receptor (FcR) binding site.

The Fc receptor can be of any class, in particular, Fc-gamma, Fc-epsilon and Fc-alpha receptors. In a particular embodiment, the functional Fc receptor binding site binds to an Fc receptor selected from: Fc-gamma (Fcγ), Fc-epsilon (Fcε) and Fc-alpha (Fcα) receptors. It will be appreciated that in order to maintain a functional Fc receptor binding site, it will be preferable that the spacer moiety is positioned N-terminal to the Fc receptor binding site.

In particular embodiments, the antibody variant is capable of binding to an Fc receptor that is phosphorylated by tyrosine kinase. In particular embodiments, the antibody variant is capable of binding to an Fc receptor that has only one or two domains and so is expected to be relatively small (and so protrudes less far from the cell surface than a larger receptor) and so be particularly suitable for targeting with an antibody variant as described herein. By particularly suitable in this context, we mean that when bound the antibody/Fc receptor complex is taken away from the close contact (due to the extension in the antibody) and so minimizes the agonistic effect on the receptor triggered by exclusion of the phosphatases.

In particular embodiments, the antibody variant is capable of binding to a receptor selected from the group consisting of, but not limited to: CLEC12A, CLEC12B, CLEC1A, CLEC1B, CLEC4A, BDCA2 (CLEC4C), MINCLE (CLEC4E), Dectin-2 (CLEC6A), Dectin-1 (CLEC7A), oxidized low-density lipoprotein receptor 1 (CLEC8A), DNGR-1 (CLEC9A), NKG2C, NKG2D, NKG2E, NKG2F, NKG2A, NKG2B, CD300a, CD300b, CD300c, CD300d, CD300e, CD300f, FcγRIIa, FcγRIIb, FcγRIIc, immunoglobulin alpha Fc receptor, FcεRIα/β complex, KIR2DL1, KIR2DL2, KIR2DL3, KIR2DL4, KIR2DL5, KIR2DS1, KIR2DS2, KIR2DS3, KIR2DS4, KIR2DS5, NKp46, NKp44, NKp30, CD33 (SIGLEC-3), SIGLEC-15, SLAMF1, 2B4 (SLAMF4), SLAMF5, SLAMF6, SLAMF7 (CRACC), CD28, CTLA-4, ICOS, PD-1, BTLA, CD200R1, CD200R2, LAIR1, glycoprotein VI (GPVI) and OSCAR.

In other embodiments, the antibody variant has a dysfunctional or disabled Fc receptor (FcR) binding site. The ability to generate antibodies with dysfunctional or disabled Fc receptor binding sites is well known and the person skilled in the art can accomplish this without inventive effort. Examples include, introducing amino acid substitutions into the Fc receptor binding site.

The antibody that is modified by inclusion of the spacer, to make the antibody variant, can be an agonistic molecule or an antagonistic molecule.

As described herein, if the antibody is an agonistic molecule then the antibody variant will reduce the superagonistic activity of the antibody. This may be desirable when the agonistic activity of a superagonistic molecule needs to be altered/reduced.

Thus, in a particular embodiment, the antibody variant of the invention is an agonistic antibody.

In a particular embodiment, the antibody variant molecule of the invention binds to CD28.

The molecule known as TGN1412 was found to be extremely toxic, initiating a cytokine storm due to its superagonistic property.

In a particular embodiment, the antibody variant of the invention is the TGN1412 antibody, or one that can bind the same epitope as TGN1412, that comprises a spacer moiety as described herein.

In a particular embodiment, the antibody variant of the invention is capable of binding the same epitope as TGN1412.

Immune Checkpoint Pathways

Therapeutic antibodies with reduced agonist activity are expected to be particularly useful in the treatment of various forms of cancer.

Cancer therapy involving the targeting of checkpoint proteins has recently proven to be particularly promising.

The terms "immune checkpoint", "immune checkpoint receptor/ligand axis" and "immune checkpoint pathway" are used interchangeably herein to refer to a receptor/ligand signaling axis (pathway) that delivers negative signals in T cells and attenuates T-cell receptor (TCR)-mediated signals. Under normal physiological conditions, immune checkpoints play crucial roles in maintaining self-tolerance and protecting tissues from damage during an immune response, such as a pathogen infection. Negative signals in T cells delivered by immune checkpoints may lead to, for example, decreased cell proliferation, cytokine production, and/or cell cycle progression. Exemplary immune checkpoint pathways that can be targeted using the methods disclosed herein include, but are not limited to, the PD-1/PD-L1 immune checkpoint pathway, and the cytotoxic T-lymphocyte antigen 4 (CTLA-4, CD152) immune checkpoint pathway.

Additional immune checkpoint pathways that can be targeted using the antibody variants and methods disclosed herein include, but are not limited to, an immune checkpoint pathway selected from: the BTLA (B- and T lymphocyte attenuator; also known as CD272), TIGIT (also known as T-cell immunoreceptor with Ig and ITIM domains), PD-1H (also known as V-domain Ig suppressor of T-cell activation; VISTA), TLT2 (also known as TREML2) and TIM-3 (T-cell immunoglobulin mucin 3; also known as HAVcr2). Specifically, antibodies, including agonistic antibodies known in literature that bind BTLA, TIGIT, PD-1H, TLT2 or TIM3 can be modified as described herein by incorporating a spacer moiety as described herein to reduce the agonistic activity of the antibody.

In a particular embodiment, the antibody variant of the invention is one that binds to an immune checkpoint pathway molecule selected from the group consisting of: PD-1, CTLA-4, TIGIT, TIM-3, BTLA, PD-1H and TLT2.

An antagonist composition that binds a receptor or ligand of an immune checkpoint pathway and attenuates signaling of the immune checkpoint pathway is referred to herein as an "immune checkpoint antagonists" (ImCpAnt).

Pd-1/Pd-L1 Immune Checkpoint Pathway

The PD-1/PD-L1 immune checkpoint axis is believed to be involved in the maintenance of peripheral tolerance and to limit T-cell effector functions within tissues. Disruption of PD-1 expression has been reported to cause autoimmune disease-like symptoms such as, a late-onset, progressive arthritis and lupus-like glomerulonephritis in mice. PD-1 is expressed during thymic development primarily on CD4-CD8-T cells, and induced on peripheral T cells, B cells, and monocytes upon activation. Members of the PD-1/PD-L1 immune checkpoint pathway include for example, PD-1, and the PD-1 ligands PD-L1 (B7-H1, CD274) and PD-L2 (B7-DC, CD273). PD-L1 is expressed on lymphoid cells such as T and B cells as well as non-lymphoid organs including heart, liver, lung, pancreas, muscle, and placenta. In contrast, PD-L2 expression is restricted to dendritic cells and macrophages.

In some embodiments, the therapeutic uses and methods of therapy use an antibody variant antagonist such as a monoclonal antibody that specifically binds PD-1, PD-L1 and/or PD-L2. Antagonists that specifically bind PD-1, PD-L1 and/or PD-L2 are known and/or can be readily identified and prepared using techniques known in the art.

In a particular embodiment, the antibody variant of the invention is an antagonist antibody wherein a spacer moiety is incorporated as described herein to reduce or eliminate agonistic activity.

Checkpoint inhibitor antagonistic antibodies such as nivolumab and pembrolizumab are proving to be of particular therapeutic benefit in the treatment of cancer. The ability to dampen any residual inherent agonistic activity that such molecules might possess may lead to molecules with increased benefit.

Thus, according to further embodiments of the invention, the antibody variant is a checkpoint inhibitor.

In a particular embodiment, the antibody variant of the invention binds PD-1.

In a particular embodiment, the antibody variant of the invention is the nivolumab antibody, or one that can bind the same epitope as nivolumab, that comprises a spacer moiety as described herein.

In a particular embodiment, the antibody variant of the invention is the pembrolizumab antibody, or one that can bind the same epitope as pembrolizumab, that comprises a spacer moiety as described herein.

In a particular embodiment, the antibody variant of the invention is the cemiplimab antibody, or one that can bind the same epitope as cemiplimab, that comprises a spacer moiety as described herein.

In a particular embodiment, the antibody variant of the invention is capable of binding the same epitope on PD-1 as nivolumab, pembrolizumab or cemiplimab.

In a particular embodiment, the antibody variant of the invention is an antibody selected from the group consisting of: MEDI0680, dostarlimab, pidilizumab, AMP-224, camrelizumab, tislelizumab, genolimzumab and JS001-PD-1, or one that can bind the same epitope as any of these antibodies, that comprises a spacer moiety as described herein.

In a particular embodiment, the antibody variant of the invention is capable of binding the same epitope on PD-1 as an antibody selected from the group consisting of: MEDI0680, dostarlimab, pidilizumab, AMP-224, camrelizumab, tislelizumab, genolimzumab and JS001-PD-1.

In a particular embodiment, the antibody variant of the invention binds CTLA-4.

In a particular embodiment, the antibody variant of the invention is the ipilimumab antibody, or one that can bind the same epitope as ipilimumab, that comprises a spacer moiety as described herein.

In a particular embodiment, the antibody variant of the invention is the tremelimumab antibody, or one that can bind the same epitope as tremelimumab, that comprises a spacer moiety as described herein.

In a particular embodiment, the antibody variant of the invention is capable of binding the same epitope on CTLA-4 as ipilimumab or tremelimimab.

In a particular embodiment, the antibody variant of the invention binds TIGIT.

In a particular embodiment, the antibody variant of the invention is an antibody selected from the group consisting of: tiragolumab, etigilimab, BMS-986207 and Ab154.

In a particular embodiment, the antibody variant of the invention is capable of binding the same epitope on TIGIT as an antibody selected from the group consisting of: tiragolumab, etigilimab, BMS-986207 and Ab154.

In a particular embodiment, the antibody variant of the invention binds TIM-3.

In a particular embodiment, the antibody variant of the invention is a variant of an antibody selected from the group consisting of: cobolimab, BMS-986258, MBG453, LY3321367 and Sym023, wherein said variant incorporates a spacer moiety as described herein.

In a particular embodiment, the antibody variant of the invention is capable of binding the same epitope on TIM-3 as an antibody selected from the group consisting of: cobolimab, BMS-986258, MBG453, LY3321367 and Sym023.

Checkpoint inhibitory antibodies are well known. For a review on immune checkpoint blockade and examples of antibodies being developed for clinical use, see Park et al. Exp 1Mol Med. 50, 109. Published online 2018 Aug. 22. doi: [10.1038/s12276-018-0130-1].

The ability to reduce intrinsic agonist activity can also be applied to anti-CD3 antibodies which are used clinically to induce T-cell anergy by weak triggering of the TCR. Currently these antibodies are engineered to minimize FcR binding so that they have only a weak agonist effect, but an alternative or supplementary approach to reduce agonism of the TCR is to introduce a rigid spacer moiety in accordance with the invention described herein.

In a particular embodiment, the antibody variant of the invention binds CD3.

In a particular embodiment, the antibody variant of the invention is an antibody selected from the group consisting of: muromab, otelixizumab, teplizumab, visilizumab and foralumab.

In a particular embodiment, the antibody variant of the invention is capable of binding the same epitope on CD3 as an antibody selected from the group consisting of: anti-CD3 antibodies: muromab, otelixizumab, teplizumab, visilizumab and foralumab.

For a review on CD3 antibodies, see Kuhn and Weiner, Immunology 8, 889-906, 2016. doi: 10.2217/imt-2016-0049. Epub 2016 May 10).

In particular embodiments, the antibody variant molecule of the invention allows movement of large membrane bound RPTPs around the antibody-bound receptor.

Throughout the description and claims of this specification, the words "comprise" and "contain" and variations of them mean "including but not limited to", and they are not intended to (and do not) exclude other moieties, additives, components, integers or steps. Throughout the description and claims of this specification, the singular encompasses the plural unless the context otherwise requires. In particular, where the indefinite article is used, the specification is to be understood as contemplating plurality as well as singularity, unless the context requires otherwise.

Features, integers, characteristics, compounds, chemical moieties or groups described in conjunction with a particular aspect, embodiment or example of the invention are to be understood to be applicable to any other aspect, embodiment or example described herein unless incompatible therewith. All of the features disclosed in this specification (including any accompanying claims, abstract and drawings), and/or all of the steps of any method or process so disclosed, may be combined in any combination, except combinations where at least some of such features and/or steps are mutually exclusive. The invention is not restricted to the details of any foregoing embodiments. The invention extends to any novel one, or any novel combination, of the features disclosed in this specification (including any accompanying claims, abstract and drawings), or to any novel one, or any novel combination, of the steps of any method or process so disclosed.

The reader's attention is directed to all papers and documents which are filed concurrently with or previous to this specification in connection with this application and which are open to public inspection with this specification, and the contents of all such papers and documents are incorporated herein by reference.

The invention will now be further described with reference to the following Examples and accompanying Figures.

Figure 3:
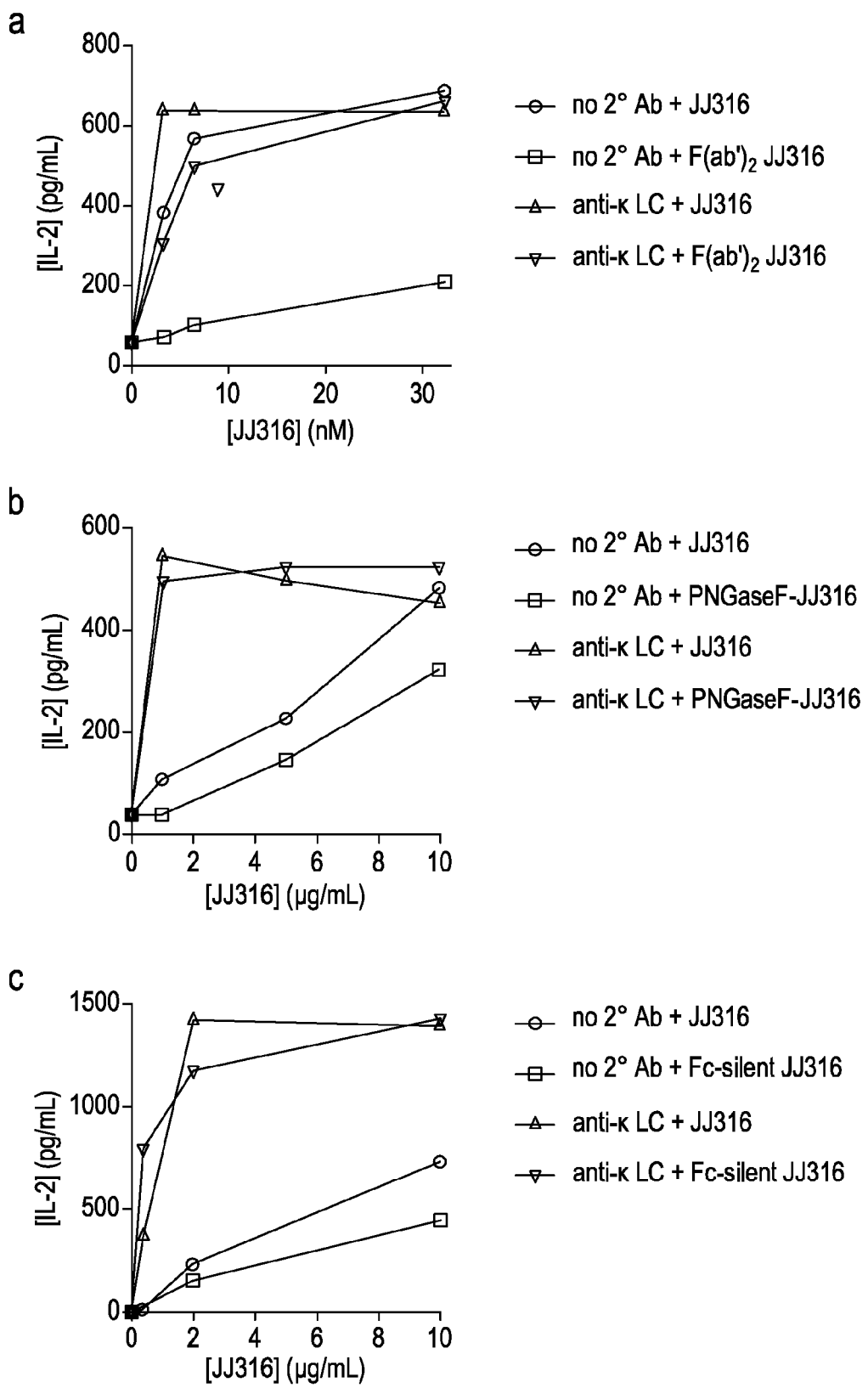
FIG. 3 JJ316 agonism is Fc-dependent, but deglycosylated and Fc-inactivated (Fc Silent™) forms of JJ316 are active. A glass surface was coated with 100 μg/mL anti-IgG kappa light chain secondary) (2° antibody (Ab), or with coating buffer only (no 2° Ab). In (a) BW5147 cells were incubated with Ficin-generated F(ab') 2 or undigested antibody and then allowed to interact with the coated glass surface. In (b) and (c) the cells were incubated with PNGase F or an Fc-inactivated form of JJ316, respectively. Note that in (a) the cells expressed higher levels of CD28 than the cells in (b) and (c), making them more sensitive to the soluble JJ316 antibody. IL-2 production was assessed after 24 hours by ELISA assay (eBioscience).

FIG. 6 Extended JJ316 antibodies are binding competent but exhibit drastically reduced signaling capacity. (a) CD28-expressing BW5147 cells were incubated with 10 μg/mL JJ316, JJ316+30, JJ316+50 or JJ319 (a non-superagonistic anti-CD28 antibody), and then placed onto a glass surface coated with 500 μg/ml donkey anti-mouse IgG (DAM) secondary antibody and the indicated titration of KT3 anti-CD38 antibody. IL-2 secretion was assessed after 24 hours. In (b) The KT3 antibody was left off the glass surface and the JJ316 antibodies added to the cells were instead titrated as indicated.

FIG. 7 CD45 is more efficiently excluded by agonistic anti-CD28 antibody contact than an extended form of the same antibody. (a) Composite images showing the distribution of antibody (red) and CD45 (green) fluorescence, for CD28-expressing cells interacting with a glass coverslip coated with donkey anti-mouse antibody. Upper and lower images show cells labeled with the superagonist, JJ316, and extended antibody, JJ316+50, respectively. In (b) intensity line profiles corresponding to the dashed white lines drawn in (a) are shown. Scale bar: 2 μm.

FIG. 8 Clone 2 binding properties. (a) Mutational analysis of the Clone 2 epitope on PD-1. Orthogonal views of the crystal structure of the ligand binding domain of mouse PD-1 (used as a model of human PD-1) are shown, with human-equivalent residues, whose mutation disrupted Clone 2 binding, coloured black, i.e. N41, K53 and A56. Residues whose mutation had no effect are coloured grey. The position of the ligand binding region of PD-1, as defined by Almo and co-workers is circled. (b) Clone 2 blocks ligand binding. PD-L1 (0.35 mg/ml) was injected into a Biacore™ flow-cell containing immobilized PD-1, before (injection 1) and after (injection 2) injection of near-saturating levels of Clone 2 antibody (0.1 mg/ml; injection 2). A representative sensogram is shown. Equivalent data were obtained for PD-L2 which binds to similar position on PD-1 to PD-L1. (c) Single-cycle kinetic analysis of the binding of soluble PD-1 to immobilized Clone 2 antibody, yielding a KD of 37 nM.

FIG. 9 Effects of the anti-PD-1 antibodies (Clone 2, Clone 10 and Clone 19) on the expansion of hPD-1 expressing versus wild type OT1 transgenic T cells in vivo following immunization with OVA (mean SEM).

FIG. 10 Ablation of Clone 2 partial agonism against PD-1 by insertion of the spacer (50-residue) described herein. (a) Effects of anti-PD-1 antibodies on transgenic CD8 T cells and (b) effects on transgenic CD4 T cells.

FIG. 11 Effects of engineered variants (D265A or 50-residue extension) of the PD-1 blocking antibody Nivolumab on the expansion of hPD-1 expressing versus wild type OT1 transgenic CD8 T cells in vivo following immunization with MVA-OVA (mean□SEM).

FIG. 12(*a*) Binding of mIgG1 and extended hinge (50-residue) mIgG1 antibodies to FcγRIIB assessed by surface plasmon resonance (SPR). (b) Dissociation constants obtained from the SPR analysis.

FIG. 13 Effectiveness of Clone 2 vs extended (50-residue) Clone 2 in the MC38 cancer model. C57BL/6 female mice were injected subcutaneously in the flank with 1×106 syngeneic colon cancer MC38 cells. When tumours reached an average size of 100 mm3, the mice were left untreated or injected twice weekly for 2 weeks (arrows) with the indicated antibodies. (a) and (b) show the results of two independent repeat experiments.

EXAMPLES

In the examples that follow it is shown that it can be difficult to remove the Fc receptor-binding activity of antibodies. It is also shown for the cases of both activating (anti-CD28) and inhibitory (anti-PD-1) antibodies, that the agonistic activities of antibodies can be substantially reduced by making the antibodies larger. In some exemplary embodiments, this is achieved by inserting a rigid spacer into the hinge region of the antibody, to extend the constant region (FIG. 1*c, d*). The sequence of an example antibody, Clone 2, showing the insertion point relative to other regions of the sequence, is shown for illustration in FIG. 2. These exemplary methods can be applied to antagonise any antibody by introducing a spacer moiety in the antibody to increase size of the antibody.

1. Methods Overview

For studies of CD28 superagonistic signaling, the anti-rat CD28 antibody, JJ316 (obtained from BD Biosciences; cat #554992) was used (Tacke et al., Eur J Immunol. 27:239-47, 1997). Other antibodies were prepared by Absolute Antibody Ltd. In some experiments, a non-superagonistic anti-CD28 antibody, JJ319 (eBioscience UK Ltd; cat no 16-0280-85), was also used. For assaying the agonistic activities of the antibodies, the CD28-expressing BW5147 T-cell hybridoma (American Type Cell Culture Collection cat no TIB-47) was pre-treated with the antibodies in solution, and the cells then allowed to settle onto glass surfaces coated with 500 μg/ml donkey anti-mouse IgG (DAM) antibody (Stratech Scientific 715-001-003-JIR). Binding of the primary antibodies to DAM mimicked FcR binding by the antibodies in vivo. To study "costimulatory" signaling by the antibodies, the anti-CD3 antibody KT3 was coupled directly to the glass surfaces, alongside the DAM. IL-2 production, measured after 72 h, was used as a readout for signaling.

Example 1. The Signaling Effects of JJ316 are Fc-Dependent; Conventional Approaches to Eliminating Fc Effector Activity have Minimal Effect on Signaling The Fc-lacking F(ab')2 fragment of the JJ316 antibody was prepared using Ficin protease (0.012-0.032 unit/ml; Sigma-Aldrich) in 300 mM potassium phosphate, 12.5 mM L-cysteine, 12.5 mM EDTA. CD28-expressing BW5147 T cells were incubated with the indicated amounts of the F(ab')2, or with whole antibody, and IL-2 production measured (FIG. 3a). Typically, 40 µl of agarose-immobilized ficin (1.2 mg/ml of settled beads) is used to digest 0.5 mg of IgG1 at 1.2 mg/ml, in 5 mM EDTA, 4 mM cysteine, 10 mM citrate pH 6.0 for 4 h at 37° C.

Complete removal of the Fc portion of JJ316 dramatically reduced the superagonistic activity of the antibody, indicating that the agonistic activities of the antibody are Fc dependent.

What is shown here is that the agonistic activity of the antibody relies on the antibody bridging the gap between the PD-1-expressing cell and an Fc-receptor bearing cell (FIG. 1a), and that it is difficult to prevent this bridging effect by inactivating the Fc-receptor binding activity of the antibody.

Two widely used approaches for eliminating FcR binding by antibodies are (1) enzymatic deglycosylation (Mimura et al., J. Biol. Chem. 276, 45539-45547, 2001), and (2) mutation of the $C_H2$ constant domain to disrupt Fc receptor binding (Duncan et al., Nature 332, 563-564, 1988). The superagonistic antibody JJ316 (1 mg/mL) was digested with PNGase F (New England Biolabs, 500,000 U/mL), which removes N-glycans from glycoproteins, in 50 mM sodium phosphate pH 7.5. PNGase F treatment had little impact on IL-2 production by the BW5147 mouse T-cell hybridoma stimulated with immobilized and soluble forms of the antibody (FIG. 3b). Similarly, an engineered version of JJ316 which is mutated so that it cannot bind to CD16/CD32 Fc receptors (Hezareh et al., J Virol 75, 12161-12168, 2001) also produced only slightly diminished signaling in the hybridoma, measured as IL-2 production (FIG. 3c). These data indicate that conventional methods for eliminating Fc function in whole mouse antibodies are not wholly effective. These findings are consistent with those of Lux et al. (J. Immunol. 190, 4315-23, 2013) who found that, for human antibodies, mutations of the Fc receptor binding site and alterations of the glycosylation of the Fc region of antibodies fail to fully abolish the interaction of all IgG subclasses with cellular Fc receptors. They concluded that IgG subclass-specific strategies would be essential to fully interfere with human FcγR binding.

Example 2. Design of an Anti-CD28 Antibody with an Extended Hinge Region

Figure 1:
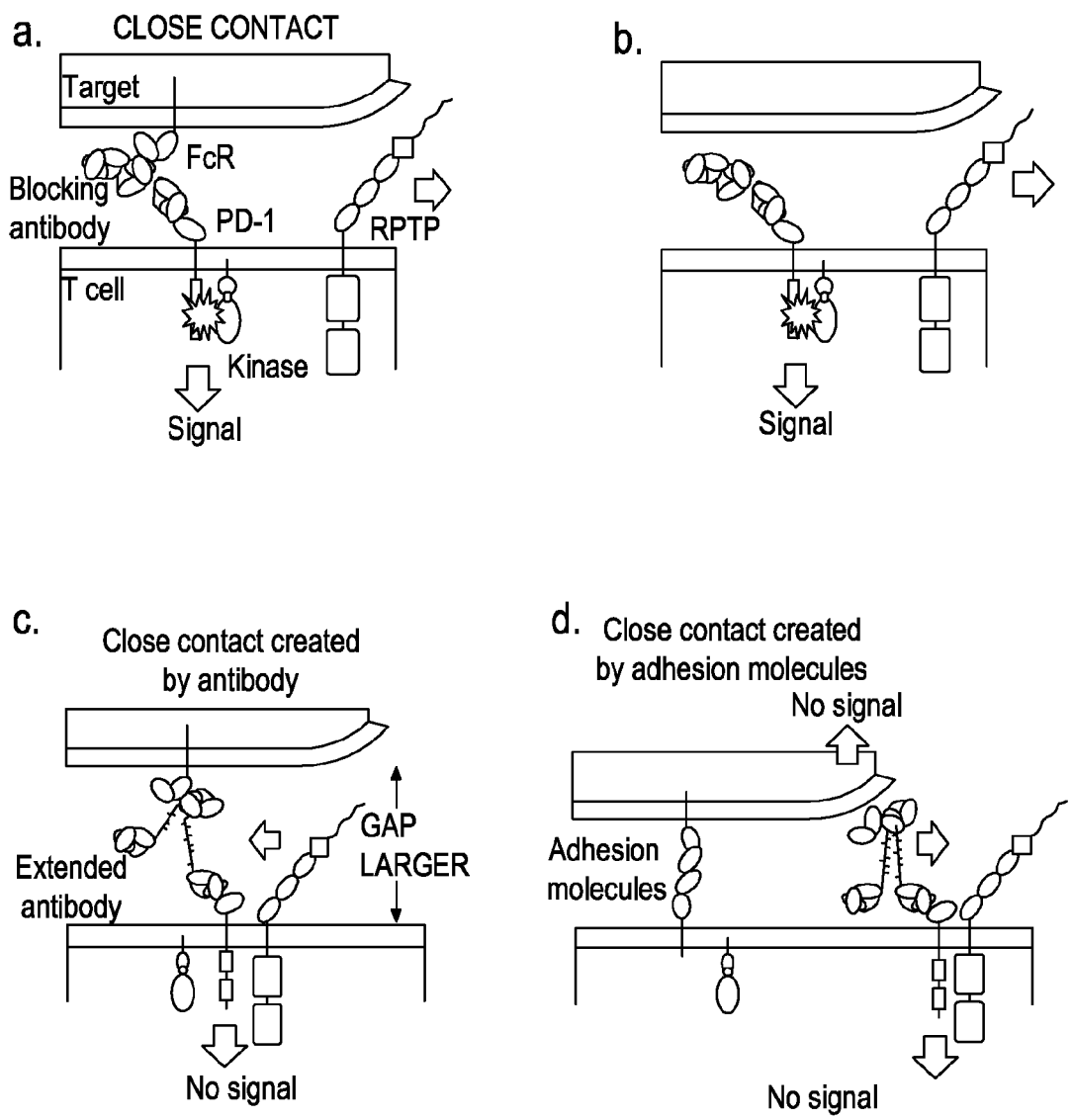
FIG. 1 Agonistic signaling by antibodies. Contact between a T cell and a target cell results in "close contact" formation, which excludes receptor-type protein tyrosine phosphatases (RPTPs), potentiating the activity of kinases. In (a), binding of a blocking antibody simultaneously to the signaling receptor (e.g. PD-1) and to an Fc receptor (FcR), holds the signaling receptor in the phosphatase depleted close contact, leading to signaling, even though the ligand binding-site of the receptor is blocked by the antibody. In (b), FcRs are absent (e.g. because the target cell is a tumour cell) or the antibody cannot bind FcRs, but the antibody/receptor complex nevertheless can enter into or remains in the close contact as it forms, leading to signaling. In (c), the antibody is extended as described herein, and the antibody creates a close contact that is large enough for the RPTPs to enter. The RPTPs then block signaling by the receptor. In (d), small adhesion proteins create the close contact, leading to the steric exclusion of the extended antibody, which carries with it the bound FcR. This prevents signaling by both the signaling receptor and the FcR.
Figure 4:
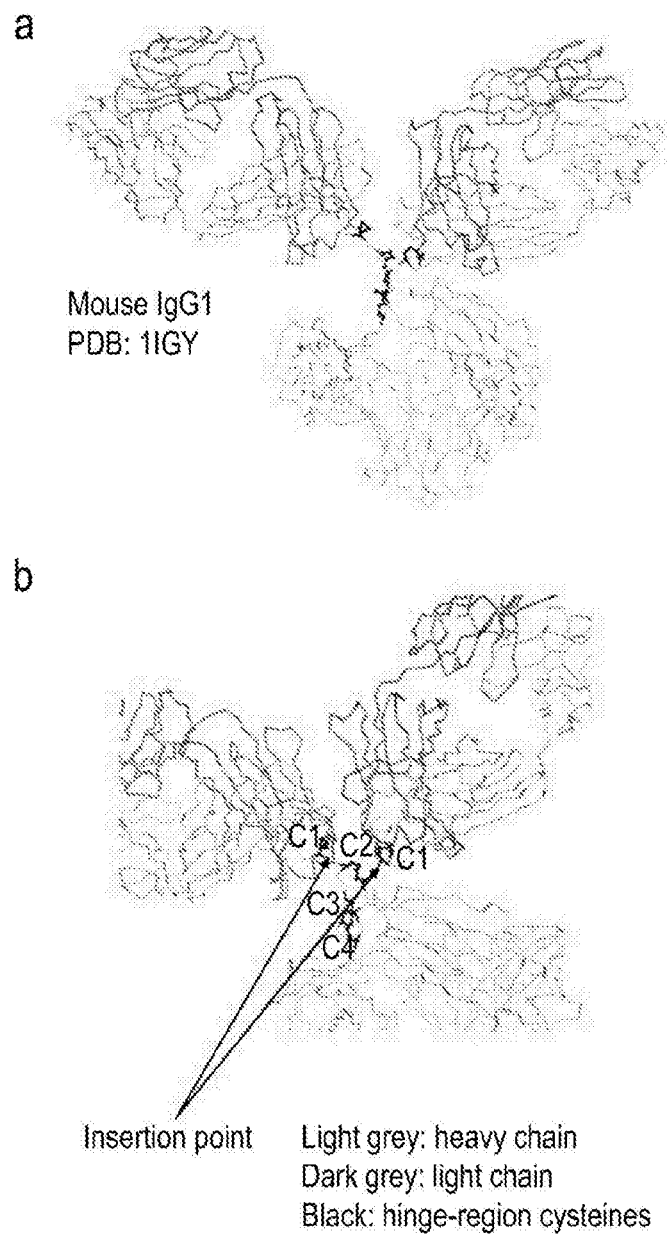
FIG. 4 Design of JJ316 antibodies extended in the hinge region. (a) Overview of the quaternary structure of an IgG antibody. (b) Detailed view of the IgG hinge region, showing the insertion point, between cysteines C1 and C2, for adding 30- or 50-residue CD43-derived mucin-like sequences to extend the antibody.

A JJ316-derived antibody was designed that was extended with an insertion in the hinge domain (FIG. 1c,d; FIG. 4). A heavily glycosylated sequence originating from the N-terminal region of the mucin-like extracellular domain of murine CD43 was selected to create a rigid, largely inflexible insertion that would extend the overall dimensions of the antibody. An extension of 30 amino acids was expected to increase the size of the antibody by 75 Å (along an axis parallel with the long axis of the Fc domain), based on the prediction that each amino acid adds 2.5 Å of extended structure (Jentoft, Trends Biochem Sci 15:291-294, 1990). A second, even larger form of the antibody was generated by inserting 50 amino acids of the N-terminal region of murine CD43.

In mouse IgG1, there are four cysteines in the heavy chain hinge region that are involved in disulphide bond formation. The N terminal-most of the four (i.e. C1; FIG. 4) pairs with a cysteine in the light chain and is important for the stability of the antibody quaternary structure. To allow the chains of the engineered antibody variant to dimerize and fold correctly, the insertion was made immediately after this cysteine, starting with a very short glycine-serine linker allowing formation of the disulphide and O-linked glycosylation of the CD43 insertion.

A second glycine-serine linker was added to connect the CD43 insertion to the rest of the Fc sequence, which included the remaining three cysteines involved in inter-heavy chain disulphide bond formation. The two antibodies were produced transiently in HEK 293T cells. The antibodies were created by methods well known in the art (see reviews by Jäger et al., High level transient production of recombinant antibodies and antibody fusion proteins in HEK 293T cells. BMC Biotechnol. 13:52, 2013; Vink et al., A simple, robust and highly efficient transient expression system for producing antibodies. Methods 65, 5-10, 2014; Kunert and Reinhart, Advances in recombinant antibody manufacturing. Appl Microbiol Biotechnol. 100, 3451-61, 2016). In outline, genes encoding the variant forms of the antibody were synthesized in their entirety using oligonucleotides. The genes were inserted into expression vectors, which were then used to transiently transfect human embryonic kidney cells. The secreted antibodies were purified by conventional chromatographic procedures well known in the art (see review by Arora et al., Affinity chromatography: A versatile technique for antibody purification. Methods. 116, 84-94, 2016).

Figure 2:
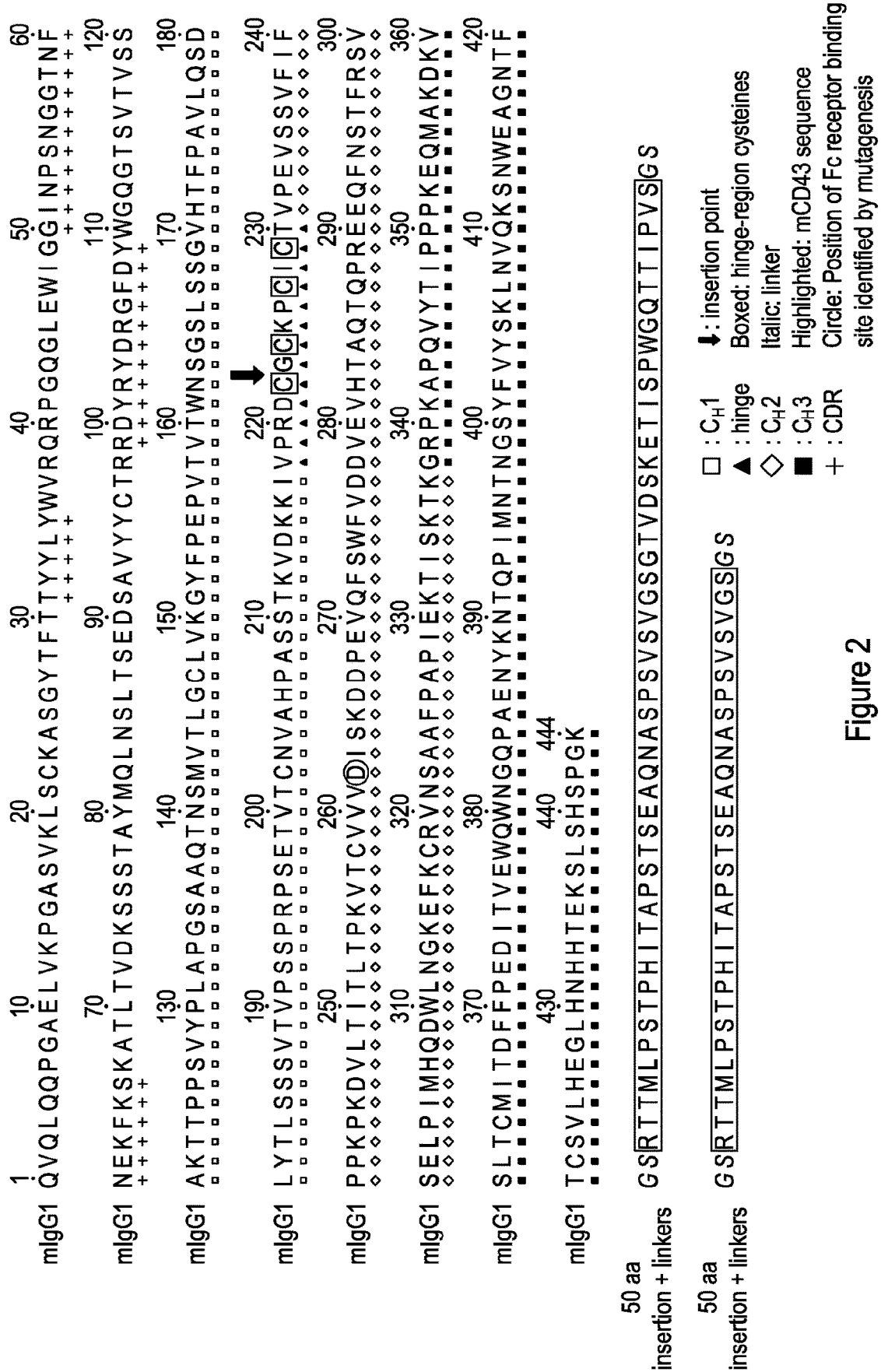
FIG. 2 shows the sequence of the heavy chain of Clone 2.

Amino acid sequences of the inserted regions (see also FIG. 2).

50 amino acid insertion (in italics):

(SEQ ID NO: 7)
VPRDCGSRTTMLPSTPHITAPSTSEAQNASPSVSVGSGTVDSKETISPW
G̲Q̲T̲T̲I̲P̲VSGSGCKPCICT 30 amino acid insertion (in italics):

(SEQ ID NO: 8)
VPRDCGSRTTMLPSTPHITAPSTSEAQNASPSVSVGSGSGCKPCICT

Key:
Hinge region sequence: underlined
Hinge region cysteine residues: bold
GS linker: normal case
Inserted CD43 mucin-like sequence: italic.

Example 3. Characterization of the Extended Anti-CD28 Antibodies

Figure 5:
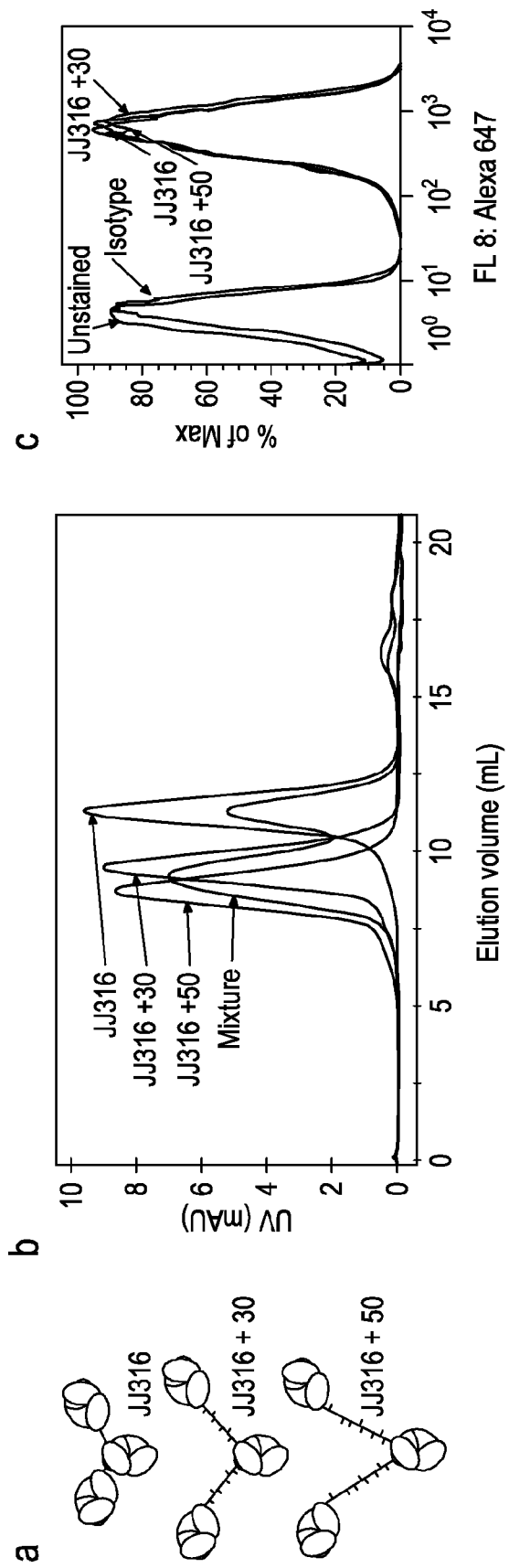
FIG. 5 Analysis of engineered, extended forms of the JJ316 antibodies. (a) Diagrams of extended antibodies. (b) Chromatographic analysis. 50 μg of unmodified JJ316, JJ316+30, and JJ316+50 were subjected to size-exclusion chromatography. Chromatograms are shown for injecting the different antibodies separately or as a mixture of ~20 μg of each antibody. An Äkta FPLC system (GE Healthcare) was used for the chromatography, fitted with a 10/300 Sepharose 200 column; injection volume was 0.5 mL. The antibody was injected into and eluted in phosphate buffered saline. (c) Extended JJ316 antibodies bind cell-surface expressed CD28. CD28-transfected BW5147 cells were incubated with unmodified or extended JJ316 antibody (at 5 μg/mL), or with no antibody, followed by incubation with Alexa647®-coupled anti-mouse secondary antibody (at 2 μg/mL). Binding was measured by flow cytometry.

The extended versions of JJ316 with the 30 and 50 amino acid insertions were analyzed by size exclusion chromatography (FIG. 5a,b). The overlaid chromatograms corresponding to the three antibodies revealed that JJ316+50 eluted first, followed by JJ316+30 and then unmodified JJ316 (FIG. 5a,b). When the antibodies were pooled and re-run, the proteins eluted in two peaks, the first corresponding to the extended antibodies, which formed a broad peak, and the second to unmodified JJ316. Therefore, the CD43 insertions successfully increased the sizes of the antibodies versus unmodified JJ316. Flow-cytometric analysis confirmed that the extended and original JJ316 antibodies bound cell-surface expressed CD28 equally well (FIG. 5c).

Example 4. Signaling Properties of the Extended Anti-CD28 Antibodies

Figure 6:
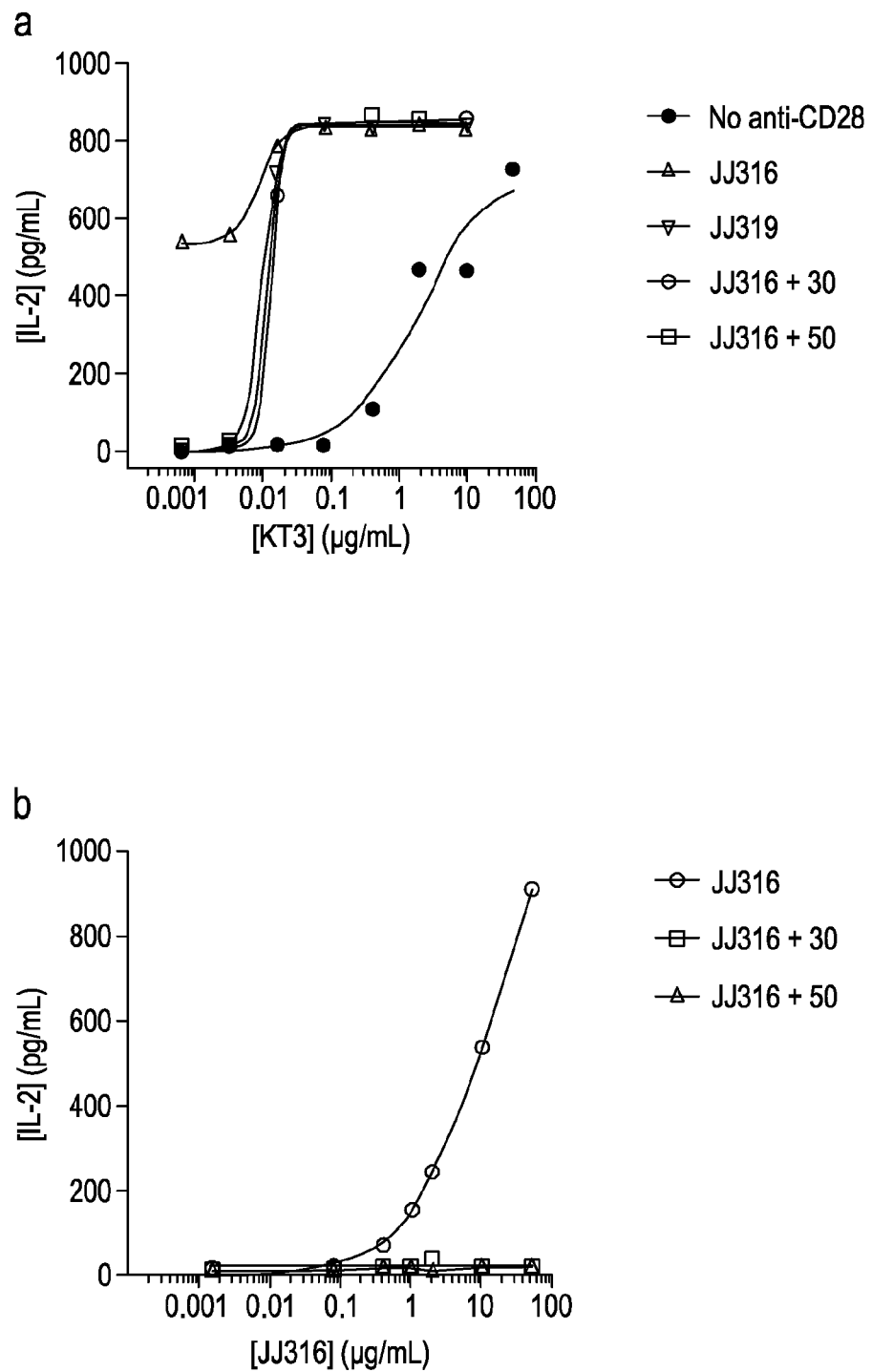

When the extended JJ316 antibodies were used to stimulate CD28-expressing BW5147 cells in combination with the anti-TCR antibody KT3, they were as effective as a second, non-superagonistic antibody, JJ319 (AbCam; Catalogue number ab35024), in reducing the amount of KT3 required to induce half-maximal signaling, fulfilling the definition of co-stimulatory activity (FIG. 6a). This confirmed that the CD28-binding properties of the antibodies, and their ability to bind to donkey anti-mouse antibody (DAM) [https://www.abcam.com/donkey-mouse-igg-h1-ab6707.html], were unaffected by the extensions of the hinge regions. In contrast to unmodified JJ316, the two extended antibodies failed to induce an IL-2 response in the absence of the anti-CD3 antibody KT3 (https://www.abcam.com/cd3-antibody-kt3-ab33429.html), which is the definition of superagonism (FIG. 6b; see Lin and Hünig, Efficient expansion of regulatory T cells in vitro and in vivo with a CD28 superagonist. Eur J Immunol. 33, 626-38, 2003).

Extending JJ316 with either a 30 or a 50 amino acid mucin-like insertion drastically reduced the signaling activity of the antibody, without altering its binding activities.

Figure 7:
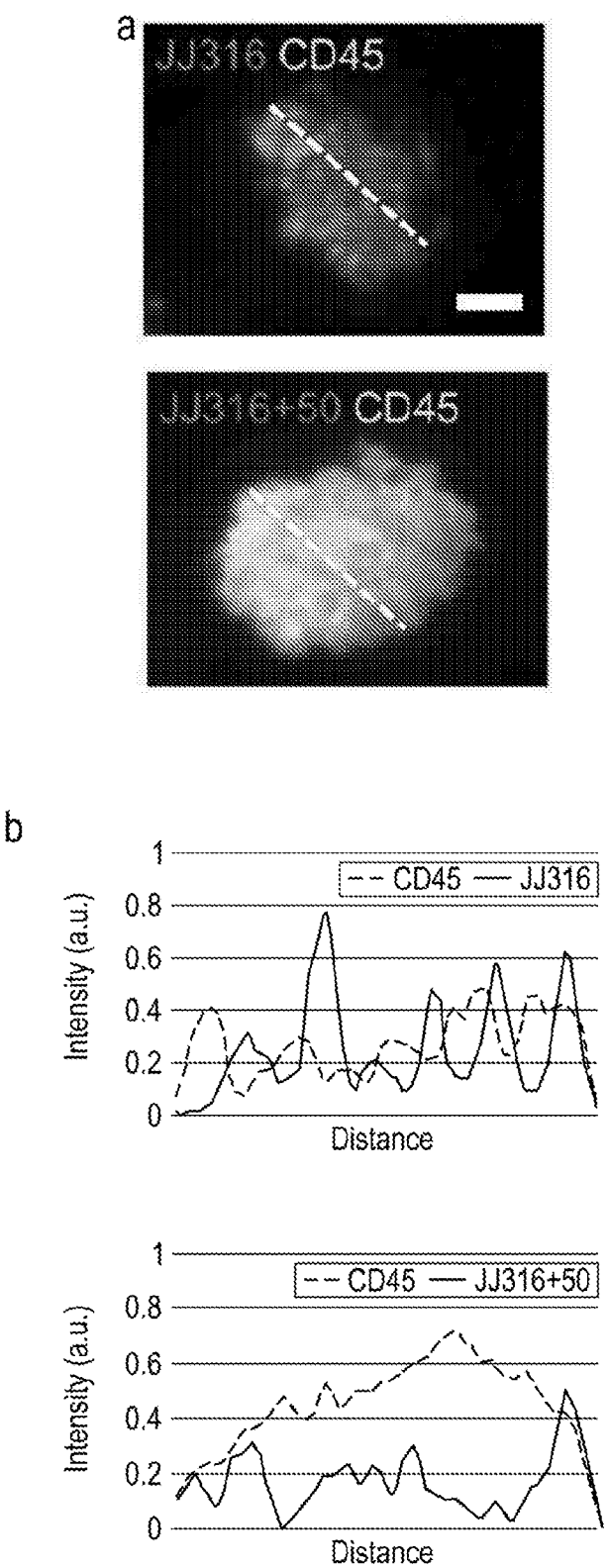

Example 5. Effect of Extending an Anti-CD28 Antibody Superagonist on RPTP (e.g. CD45) Exclusion To visualize the effect of extending an agonistic antibody on the local exclusion of CD45 when a cell engages the antibody, total internal fluorescence (TIRF) imaging was used. The superagonistic antibody, JJ316, and an extended form of the antibody, JJ316+50, were labeled with a fluorescent dye (Alexa-647). The labeled antibodies, at 50 μg/ml, were incubated with cells expressing CD28, alongside 20 μg/ml of fluorescently labeled Fab fragments of an anti-mouse CD45 antibody (YW62.3.20, obtained from the Sir William Dunn School, Oxford, labeled with Alexa-488 fluorescent dye), prior to being placed on glass coverslips (coated overnight with 500 g/ml donkey anti-mouse antibody), and imaged using TIRF (FIG. 7a; composite images shown are averaged from 100 frames, taken at 50 ms exposure). The imaging clearly showed that the superagonistic antibody, JJ316, more effectively excluded CD45 than the extended antibody, JJ316+50, as evidenced by the greater Alexa-488 (i.e. CD45) fluorescence under the cells incubated with JJ316+50, relative to the Alexa-647 (i.e. antibody) fluorescence (FIG. 7a,b).

Example 6. Binding Properties of the Anti-PD-1 Antibody Clone 2

Figure 8:
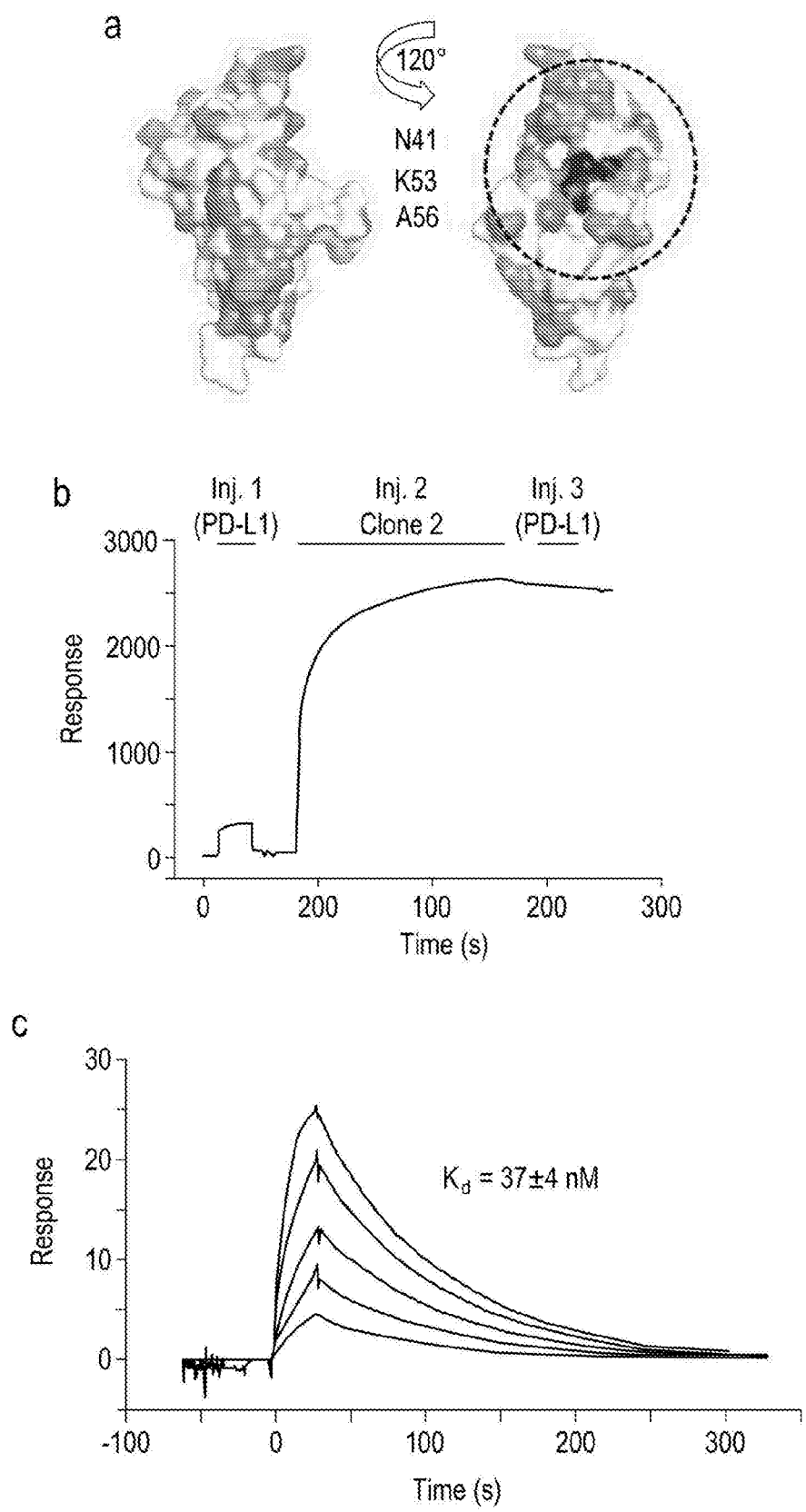

Antibodies recognizing the anti-cancer target PD-1 were generated by immunizing mice with the extracellular region of PD-1 expressed as a fusion protein with the Fc region of mouse IgG1. The epitope of one of these antibodies, Clone 2 (as described in EP2342228B1), was mapped by making drastic mutations to putatively surface-exposed residues in the extracellular immunoglobulin superfamily domain of PD-1, and then expressing the mutated proteins on the surface of HEK 293T cells. The capacity of Clone 2 (as described in EP2342228B1), to bind to the mutated protein was then assessed by flow cytometry. This analysis indicated that Clone 2 binds to the region of PD-1 shown by Almo and co-workers to bind its native ligands PD-L1 and PD-L2 (Zhang et al., Immunity. 2004 20, 337-47; FIG. 8a). Using surface plasmon resonance-based assays, the ability of PD-1 to bind both Clone 2 and the ligands PD-L1 and PD-L2 was tested by sequentially injecting the antibody and the ligand into a flow cell containing immobilized PD-1 (FIG. 8b). PD-L1 (and PD-L2) failed to bind to PD-1 after it had bound near-saturating levels of Clone 2 antibody, confirming that Clone 2 is a blocking antibody. A single-cycle kinetic analysis (FIG. 8c) revealed that the dissociation constant (KD) for Clone 2 binding to PD-1 is 37 nM, which is only ~2-fold lower than that for Nivolumab binding to PD-1 (16 nM).

Example 7. The PD-1 Blocking Antibody Clone 2 is Agonistic

A sensitive T-cell transfer assay was used to measure the agonistic versus antagonistic effects of Clone 2 antibody in vivo. In this assay, 5×105 T cells, comprising a mixture of purified OT1 (TCR transgenic) CD8+ T cells specific for ovalbumin (OVA) from mice expressing homozygous human PD-1 (hPD-1), and from OT1 mice expressing the wild-type PD-1 receptor (obtained from Jackson Laboratories), were transferred into wild-type (C57BL/6) recipients. The transferred cells were distinguished from host cells using the CD45.2 (versus CD45.1) allotypic marker. The following day, the recipient mice were immunized with a Modified Vaccinia Ankara virus expressing OVA (MVA-OVA; 108 pfu) to induce expansion of the T cells (obtained from the Jenner Institute, University of Oxford). On the second day, the mice were dosed with 200 μg of antibody, intraperitoneally. Eight days following the initial transfer of the T cells, the ratio of the humanized PD-1-expressing and wild-type OVA-specific T cells was determined. In this way, it is possible to track the expansion or contraction of the humanized cells, which bind the anti-human PD-1 antibodies, relative to the wild-type controls, which do not.

Figure 9:
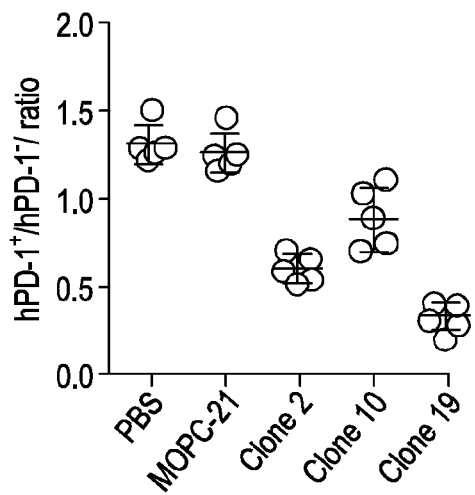

In the T-cell transfer assay, the PD-1 blocking antibody Clone 2 (as described in EP2342228B1), suppressed the expansion of the hPD-1 cells relative to that observed in isotype control treated or untreated mice (FIG. 9; mean☐SEM). Two additional antibodies also exhibited agonistic activity. This included a second blocking antibody, Clone 10 (an anti-PD-1 antibody. See EP2342228B1), which binds with relatively low affinity to PD-1 (6.2±0.3 μM), and a non-blocking antibody, Clone 19 (as described in EP2342228B1), that binds a wholly different epitope. This suggests that agonistic signaling capacity is an intrinsic property of anti-PD-1 antibodies, regardless of affinity or epitope position.

Example 8. The Agonistic Activity of Clone 2 can be Ablated by Extending the Hinge Region of the Antibody To ablate the agonistic signaling capacity of Clone 2 (as described in EP2342228B1), a 50 amino acid segment of the mucin-like extracellular region of CD43 was inserted into the hinge region of the antibody, exactly as indicated in Example 3 and using the sequences shown in FIG. 2, creating an extended form of the antibody. The antibody was expressed transiently in HEK 293T cells. The agonistic activity of the extended antibody was compared to that of the parental antibody, a non-blocking agonist Clone 19, and the anti-hPD-1 checkpoint blocking antibody Nivolumab, which was mutated at D265A to reduce Fc receptor binding (Nivo 265A). Nivolumab is available commercially from a number of suppliers, such as Absolute Antibody. The D265A mutation reduces FcR binding, so that the blocking activity of the antibody is enhanced.

Figure 10:
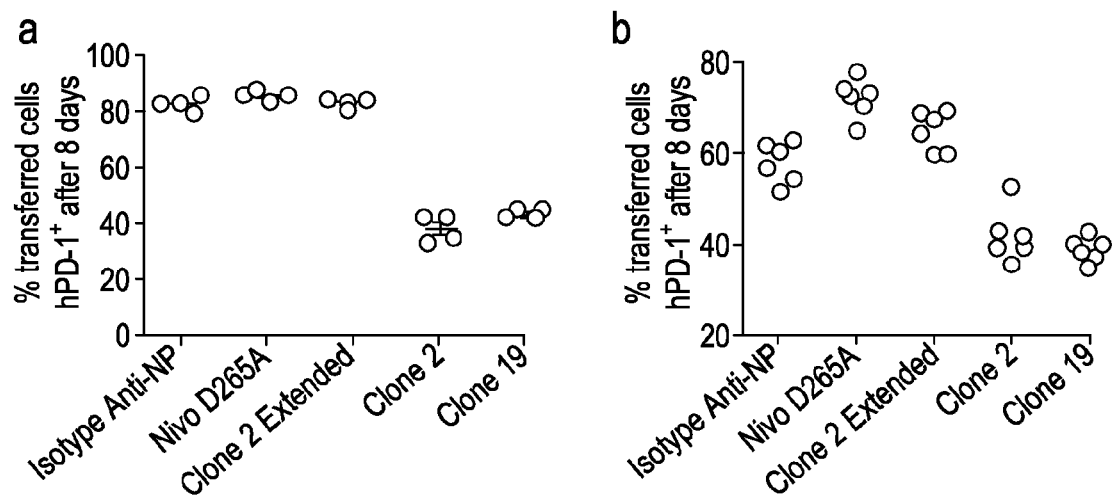

In the T-cell transfer assay of antibody agonism, the Clone 19 and Clone 2 antibodies exhibited agonistic signaling effects, suppressing the expansion of human PD-1 expressing CD8 T cells relative to mouse cells and the situation where mice are injected with an anti-NP isotype control antibody (FIG. 10a). The anti-hPD-1 checkpoint blocking antibody Nivolumab was inactive, presumably because the D265A mutation reduced FcR binding, supporting the explanation for agonistic signaling shown in FIG. 1a. Similar results were seen in a CD4 T-cell transfer assay in which transferred OTII (OVA-specific) CD4 cells are stimulated with OVA in Alum before being treated with antibody (FIG. 10b). As can be seen from the data, the extended Clone 2 antibody was no longer an agonist and had similar blocking activity to the D265A-mutated form of Nivolumab, despite retaining FcR binding ability.

Figure 11:
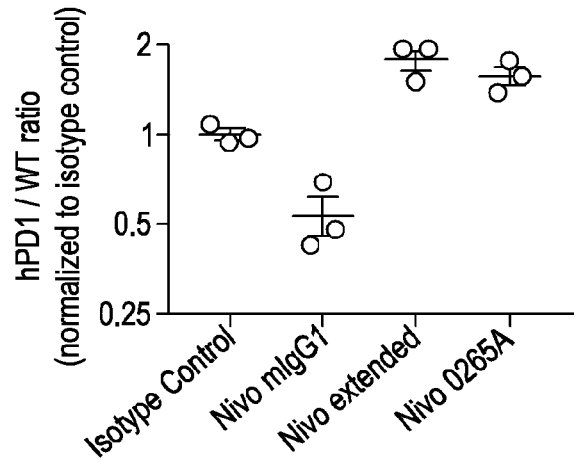

Example 9. The Agonistic Activity of the PD-1 Blocking Antibody Nivolumab can be Ablated by Extending the Hinge Region of the Antibody Nivolumab is a PD-1 blocking antibody used clinically for the treatment of cancer patients. The antibody used in the clinic is a human IgG4 isotype. In order to assess the antibody in humanized PD-1 mice it was expressed as a chimera comprising the variable domains of Nivolumab fused to murine IgG1 isotype heavy- and light-chain constant regions. When tested in the sensitive CD8 T-cell transfer assay described in Example 8, this chimeric antibody suppressed the expansion of human PD-1 expressing cells, suggesting that it delivers an agonistic signal through the receptor (FIG. 11; mean±SEM). Conversely, when the chimeric antibody was expressed with a D265A mutation which reduces FcR binding, it caused expansion of human PD-1 expressing CD8 T cells as would be expected from a checkpoint blocking antibody (FIG. 11). The chimeric antibody was also expressed in an extended form containing the 50-residue extension described in Example 3. This extended version of the antibody also increased the expansion of human PD-1 expressing CD8 T cells suggesting that the hinge extension removes the agonistic potential of the antibody leading to more efficient blockade of the pathway (FIG. 11).

The human IgG4 isotype of the clinical Nivolumab compound does display Fc-receptor binding, suggesting that this drug will have the potential to deliver an agonistic signal through the PD-1 receptor. Whilst the net effect of the drug in the context of metastatic malignancy is clearly PD-1 pathway blockade, the efficacy of this blockade could potentially be increased by removing any agonistic activity with the extension of the constant region. This could lead to more significant tumour rejection in responding patients or may increase the proportion of patients who have a response.

Figure 12:
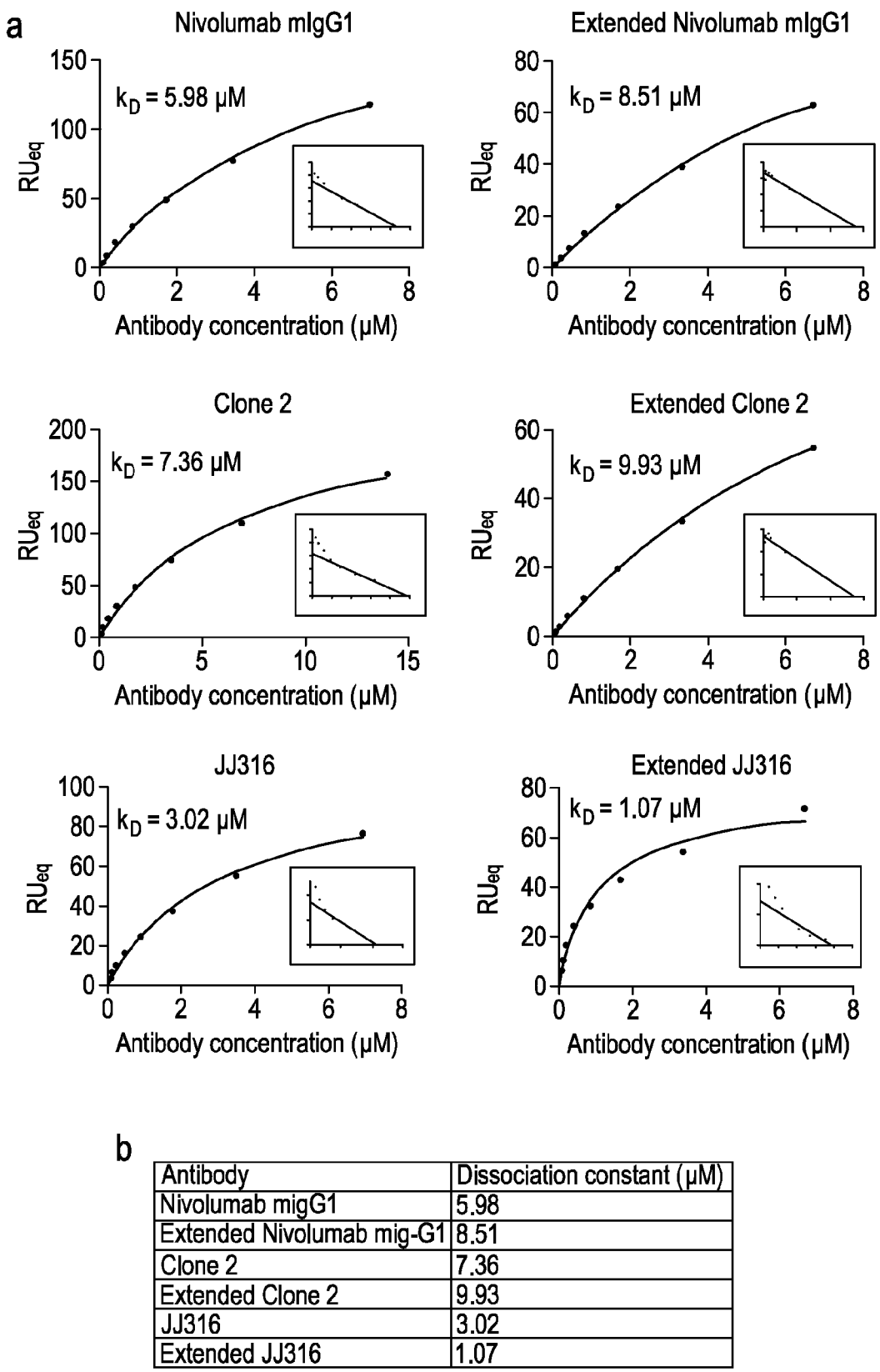

Example 10. Hinge Extension does not Alter Binding of mIgG1 Antibodies to FcγRIIB SPR was used to assess whether the 50-residue extension significantly affected Fc-receptor binding. Murine FcγRIIB extracellular domain was covalently couple to a CM5- series-S sensor chip by amine coupling. A similar sized protein (mouse CD200 extracellular domain) was coupled to the reference channel. Increasing concentrations of mIgG1 antibody or extended hinge mIgG1 antibody were injected over the chip at 37° C. and binding at equilibrium measured. Reference-subtracted binding at equilibrium versus concentration was plotted for each antibody (FIG. 12a; inset Scatchard plots display the quality of fit of the data) and dissociation constants were calculated (FIG. 12b). The extended hinge version of each antibody bound to FcγRIIB with equivalent affinity to the parental antibody.

Example 11. Increasing the Efficacy of Anti-PD-1 Checkpoint Blockade in Cancer

Figure 13:
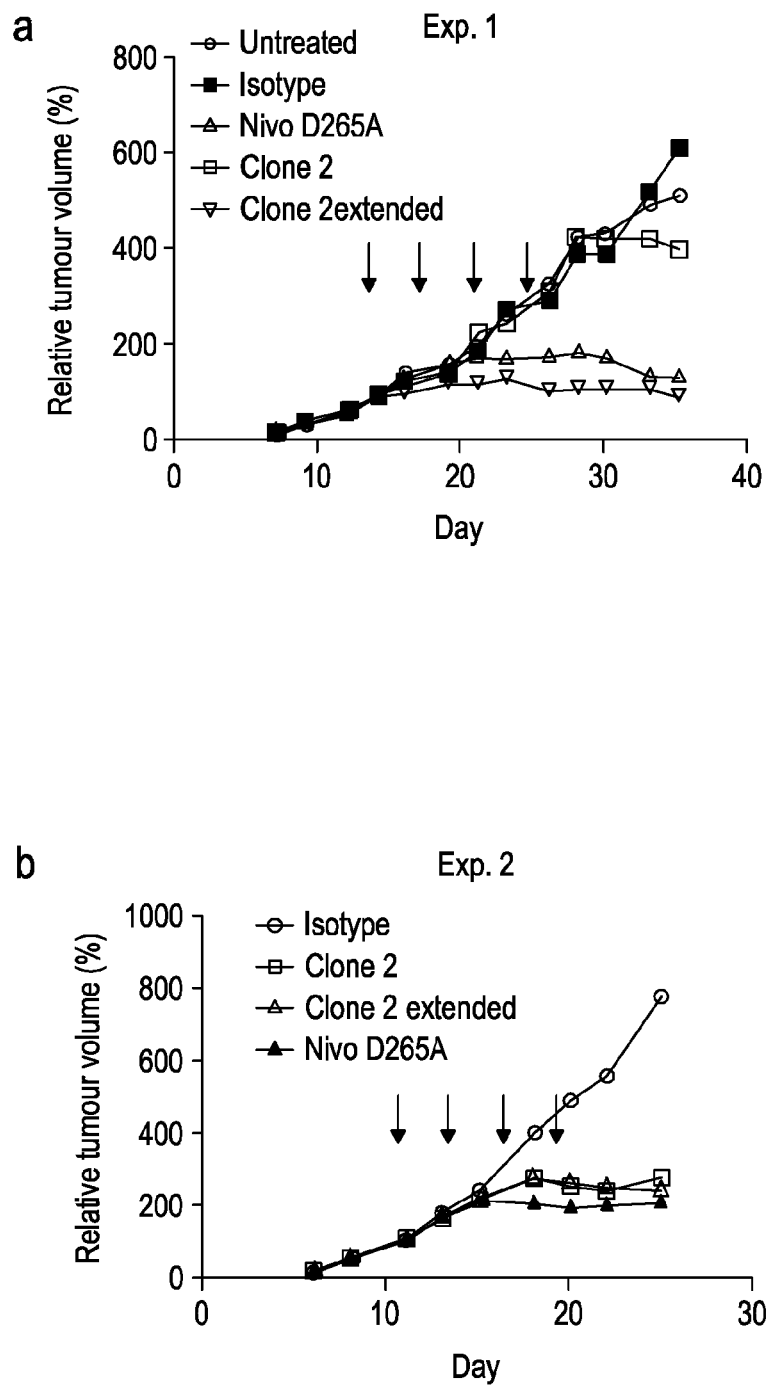

To test whether ablating the agonistic signaling activity of Clone 2 improved its performance as a blocking anti-PD-1 antibody for treating cancer, the MC38 syngeneic colon cancer model, which has been used previously to demonstrate the efficacy of anti-mouse PD-1 checkpoint blockade, was used (US 2014/0348743). Groups of adult female hPD-1-expressing C57BL/6 female mice were injected subcutaneously in the flank with 1×106 syngeneic colon cancer MC38 cells (obtained from Crown-Bio, Loughborough, UK). When tumours reached an average size of 100 mm3, the mice were left untreated or injected twice weekly for 2 weeks with 10 mg/kg of an anti-NP isotype control, Nivo D265A, or with intact Clone 2 antibody or with extended (50-residue) Clone 2 antibody. This analysis of the efficacy of Clone 2 and extended Clone 2 antibody showed that the activity of the extended antibody was indistinguishable from that of Nivo D265A in two independent repeat experiments (FIG. 13a,b). In contrast, Clone 2 exhibited considerable experiment-to-experiment variation in its ability to suppress MC38 tumour growth. In one experiment, Clone 2 exhibited almost no blocking activity, and in the second it was as effective as the extended Clone 2 antibody. In both experiments the extended Clone 2 antibody blocked tumour growth.

P262167WO

SEQUENCE LISTING

Taken from Protein Data Bank (PDB) file 1HZH (hIgG1 heavy chain)

SEQ ID NO: 1

QVQLVQSGAEVKKPGASVKVSCQASGYRFSNFVIHWVRQAPGQRFEWMG

WINPYNGNKEFSAKFQDRVTFTADTSANTAYMELRSLRSADTAVYYCAR

VGPYSWDDSPQDNYYMDVWGKGTTVIVSSASTKGPSVFPLAPSSKSTSG

GTAALGCLVKDYFPEPVTVSWNSGALTSGVHTFPAVLQSSGLYSLSSVV

TVPSSSLGTQTYICNVNHKPSNTKVDKKAEPKSCDKTHTCPPCPAPELL

GGPSVFLFPPKPKDTLMISRTPEVTCVVVDVSHEDPEVKFNWYVDGVEV

HNAKTKPREEQYNSTYRVVSVLTVLHQDWLNGKEYKCKVSNKALPAPIE

KTISKAKGQPREPQVYTLPPSRDELTKNQVSLTCLVKGFYPSDIAVEWE

SNGQPENNYKTTPPVLDSDGSFFLYSKLTVDKSRWQQGNVFSCSVMHEA

LHNHYTQKSLSLSPGK

Position of CDR1: 31-35, inclusive
Position of CDR2: 50-66, inclusive
Position of CDR3: 99-116, inclusive
Position of $C_H1$: 128-225, inclusive Position of hinge: 226-240, inclusive Position of $C_H2$: 241-350, inclusive Position of $C_H3$: 351-457, inclusive Position of the Fc receptor binding regions: 241-249, inclusive; 274-280, inclusive; 304-309, inclusive; 335-342, inclusive.

Positions of CDRs were predicted by ABodyBuilder, using the Kabat setting (Dunbar et al., SAbPred: a structure-based antibody prediction server, Nucleic Acids Res. 44:474-8, 2016). The positions of the residues forming the contacting regions with Fcγ receptors were predicted using PISA (Krissinel and Henrick, J. Mol. Biol. 372:774-797, 2007).

(Mouse IgG1 heavy chain from Clone 2 in EP2342228B1)

SEQ ID NO: 2
QVQLQQPGAELVKPGASVKLSCKASGYTFTTYYLYWVRQRPGQGLEWIG

GINPSNGGTNFNEKFKSKATLTVDKSSSTAYMQLNSLTSEDSAVYYCTR

RDYRYDRGFDYWG

P262167WO
QGTSVTVSSAKTTPPSVYPLAPGSAAQTNSMVTLGCLVKGYFPEPVTVT

WNSGSLSSGVHTFPAVLQSDLYTLSSSVTVPSSPRPSETVTCNVAHPAS

STKVDKKIVPRDCGCKPCICTVPEVSSVFIFPPKPKDVLTITLTPKVTC

VVVDISKDDPEVQFSWFVDDVEVHTAQTQPREEQFNSTFRSVSELPIMH

QDWLNGKEFKCRVNSAAFPAPIEKTISKTKGRPKAPQVYTIPPPKEQMA

-continued

KDKVSLTCMITDFFPEDITVEWQWNGQPAENYKNTQPIMNINGSYFVYS

KLNVQKSNWEAGNTFTCSVLHEGLHNHHTEKSLSHSPGK

Position of CDR1: 31-35, inclusive
Position of CDR2: 50-66, inclusive
Position of CDR3: 99-109, inclusive
Position of $C_H1$: 121-217, inclusive
Position of hinge: 218-230, inclusive
Position of $C_H2$: 231-337, inclusive
Position of $C_H3$: 338-444, inclusive
Position of the Fc receptor binding region: 262 (identified by mutagenesis).

Positions of CDRs were predicted by ABodyBuilder, using the Kabat setting (Dunbar et al., SAbPred: a structure-based antibody prediction server, Nucleic Acids Res. 44, 474-8, 2016).

SEQ ID NO: 3
RTTMLPSTPHITAPSTSEAQNASPSVSVGSGTVDSKETISPWGQTTIPVS

SEQ ID NO: 4
RTTMLPSTPHITAPSTSEAQNASPSVSVGS

SEQ ID NO: 5
STTAVQTPTSGEPLVSTSEPLSSKMYTTSITSDPKADSTGDQTSALPPST

SEQ ID NO: 6
STTAVQTPTSGEPLVSTSEPLSS

SEQ ID NO: 7
VPRDCGSRTTMLPSTPHITAPSTSEAQNASPSVSVGSGTVDSKETISPWG
QTTIPVSGSGCKPCICT

P262167WO

SEQ ID NO: 8
VPRDCGSRTTMLPSTPHITAPSTSEAQNASPSVSVGSGSGCKPCICT

---

The invention claimed is:

1. An antibody variant molecule comprising:
   (A) a heavy chain polypeptide comprising a variable domain ($V_H$), three constant domains ($C_H1$, $C_H2$, and $C_H3$), and a hinge region located between CHI and $C_H2$;
   (B) a light chain polypeptide comprising a variable domain ($V_L$) and a constant domain ($C_L$); and
   (C) a first spacer moiety, and, optionally, a second spacer moiety,
   wherein:
   (i) an Fc receptor binding site is located within $C_H2$ or $C_H3$;
   (ii) $V_H$ and $V_L$ form an antigen-binding site;
   (iii) the first spacer moiety is located within the hinge region or in the $C_H1$ and the second spacer moiety is located in the $C_L$;
   (iv) a parental antibody comprising the heavy chain polypeptide of (A) and light chain polypeptide of (B), but lacking any spacer moiety of (C), has agonistic activity, and the first spacer moiety or the first and the second spacer moieties reduces the agonistic activity of the antibody variant molecule as compared to the parental antibody as measured by a T-cell transfer assay or IL-2 secretion;
   (v) the first or the second spacer moiety comprises a polypeptide sequence of 20 amino acids to 80 amino acids;
   (vi) at least 25% of the amino acids of the polypeptide sequence of the first or the second spacer moiety are serine and threonine residues;
   (vii) the first spacer moiety or the first and the second spacer moieties increases the length and/or overall dimensions of the molecule by at least 50 Å; and
   (viii) the antibody variant molecule binds to an immune checkpoint pathway molecule.

2. The antibody variant molecule of claim 1, wherein the first spacer moiety or the first and the second spacer moieties increases the length, Stoke radius, and/or overall dimensions of the molecule by at least 60 Å, 70 Å, or 75 Å.

3. The antibody variant molecule of claim 1, wherein the first spacer moiety is located in the CHI or hinge region.

4. The antibody variant molecule of claim 1, wherein inclusion of the first spacer moiety or the first and the second spacer moieties positions the Fc receptor binding site of the antibody variant molecule further from a membrane when the antibody variant molecule is bound to its antigen on the membrane, as compared to the parental antibody molecule.

5. The antibody variant molecule of claim 1, wherein the polypeptide sequence of the first or the second spacer moiety has a persistence length of at least 4 nm.

6. The antibody variant molecule of claim 1, wherein the polypeptide sequence of the first or the second spacer moiety comprises a mucin or mucin-like polypeptide sequence.

7. The antibody variant molecule of claim 6, wherein the polypeptide sequence comprises a sequence selected from the group consisting of SEQ ID NOs: 3-6.

8. The antibody variant molecule of claim 1, wherein the presence of the first spacer moiety or the first and the second spacer moieties reduces the agonistic activity of the antibody variant by at least 25% relative to the parental antibody molecule as measured by a T-cell transfer assay or IL-2 secretion.

9. The antibody variant molecule of claim 1, wherein the antibody variant molecule is a human or humanized antibody.

10. The antibody variant molecule of claim 1, wherein the antibody variant molecule is a human monoclonal antibody.

11. The antibody variant molecule of claim 1, wherein the antigen binding site binds to a receptor that has an immunoreceptor tyrosine-based activation motif or an immunoreceptor tyrosine-based inhibition motif.

12. The antibody variant molecule of claim 1, wherein the immune checkpoint pathway molecule is selected from the group consisting of: PD-1, CTLA-4, TIGIT, BTLA, PD-1H, TLT2 and TIM-3.

13. The antibody variant molecule of claim 1, wherein the antibody variant molecule is antagonistic to the immune checkpoint pathway molecule.

14. One or more nucleic acid molecules that encode one or more polypeptides capable of forming the antibody variant molecule of claim 1.

15. A host cell comprising the one or more nucleic acid molecules of claim 14.

16. A method of producing an antibody variant molecule, the method comprising expressing the one or more nucleic acid molecules of claim 14 in a host cell.

17. A pharmaceutical composition comprising an antibody variant molecule of claim 1, and at least one pharmaceutically acceptable excipient.

18. A method of therapeutically treating cancer in a subject in need thereof, comprising administering to the subject the antibody variant of claim 1.

19. A method for reducing an agonistic activity of an antibody molecule, comprising introducing a spacer moiety into the antibody molecule, wherein the spacer moiety comprises a polypeptide sequence of 20 to 80 amino acids and wherein at least 25% of the amino acids of the polypeptide sequence of the spacer moiety are serine and threonine residues, wherein the spacer moiety is introduced into a $C_H1$, hinge region, or $C_L$ of the antibody, and wherein the antibody molecule binds to an immune checkpoint pathway molecule.

* * * * *